United States Patent
Rydin et al.

(10) Patent No.: US 12,007,053 B2
(45) Date of Patent: *Jun. 11, 2024

(54) TRANSMITTER FOR QUICK CONNECTOR

(71) Applicant: TI GROUP AUTOMOTIVE SYSTEMS, LLC, Auburn Hills, MI (US)

(72) Inventors: Cody Rydin, Sterling Heights, MI (US); Rick Pepe, Macomb, MI (US); David Gabbey, Pinckney, MI (US); Alexis Rogers, Troy, MI (US); Seong-Hwa Choo, Incheon (KR); Jeong-Ho Lim, Incheon (KR); Dong-Hyeok Lee, Incheon (KR)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/482,331

(22) Filed: Sep. 22, 2021

(65) Prior Publication Data
US 2022/0010907 A1    Jan. 13, 2022

Related U.S. Application Data

(63) Continuation-in-part of application No. 16/817,085, filed on Mar. 12, 2020, now Pat. No. 11,262,008.

(51) Int. Cl.
*F16L 37/12* (2006.01)

(52) U.S. Cl.
CPC ....... *F16L 37/1225* (2013.01); *F16L 2201/10* (2013.01)

(58) Field of Classification Search
CPC ..... F16L 2201/10; F16L 22/10; F16L 37/086; F16L 2201/60; F16L 37/12; F16L 37/144
See application file for complete search history.

(56) References Cited

U.S. PATENT DOCUMENTS 6,897,374 B2   5/2005   Garber et al.
7,128,347 B2   10/2006  Kerin
(Continued)

FOREIGN PATENT DOCUMENTS

EP   1762541 B1   6/1930
EP   2018345 A1   1/2009
(Continued)

OTHER PUBLICATIONS

International Preliminary Report on Patentability dated Sep. 6, 2022.

*Primary Examiner* — David Bochna
(74) *Attorney, Agent, or Firm* — DICKINSON WRIGHT PLLC

(57) ABSTRACT

A quick connector coupling for making a severable connection with a male member and a female tube in a fluid line includes a connector body having a through bore for receiving the male member having a tubular shape sized to extend into the through bore of the connector body and having an upset, a retainer releasably securing the male member within the connector body, and a verifier including a conductor and moving between a verified position and an unverified position inside the connector body. The connector body includes a radio frequency identification (RFID) chip and an antenna electrically connected to the RFID chip to form a first circuit. In the unverified position of the verifier, the RFID chip electrically connected to the antenna sends an unverified signal through the antenna, and when the verifier is moved in the verified position, the RFID chip sends a verified signal through the antenna.

20 Claims, 17 Drawing Sheets

(56) References Cited

U.S. PATENT DOCUMENTS

| | | | |
|---|---|---|---|
| 7,244,142 | B2 | 7/2007 | Kato |
| 7,394,375 | B2 | 7/2008 | Johnson |
| 7,647,954 | B2 | 1/2010 | Garber et al. |
| 7,793,839 | B2 | 9/2010 | Zosimadis et al. |
| 8,373,961 | B2 | 2/2013 | Kuck et al. |
| 8,401,777 | B2 | 3/2013 | Ryman |
| 11,262,008 | B2 * | 3/2022 | Rydin .................... F16L 33/10 |
| 2016/0201835 | A1 | 7/2016 | Jones et al. |
| 2018/0266602 | A1 * | 9/2018 | Fremont ............. F16L 37/0985 |
| 2019/0257456 | A1 * | 8/2019 | Ignaczak ............... F16L 37/133 |
| 2020/0166167 | A1 * | 5/2020 | Hagen ................ F16L 37/0885 |
| 2020/0309298 | A1 * | 10/2020 | Kuhn ................... F16L 37/084 |
| 2021/0396336 | A1 * | 12/2021 | Schröter ............. F16L 37/0841 |
| 2022/0003347 | A1 * | 1/2022 | Barthel ............... F16L 37/0885 |
| 2022/0221091 | A1 * | 7/2022 | Price ...................... F16L 23/10 |
| 2022/0221095 | A1 * | 7/2022 | Nutt ....................... F16L 33/03 |

FOREIGN PATENT DOCUMENTS

| | | |
|---|---|---|
| EP | 2052280 A1 | 4/2009 |
| EP | 2732194 B1 | 11/2015 |
| WO | 2007/003770 A1 | 1/2007 |
| WO | 2011/003523 A1 | 1/2011 |
| WO | 2011/035987 A1 | 3/2011 |
| WO | 2019/033109 A1 | 2/2019 |

* cited by examiner

FIG. 10
FIG. 11
FIG. 12
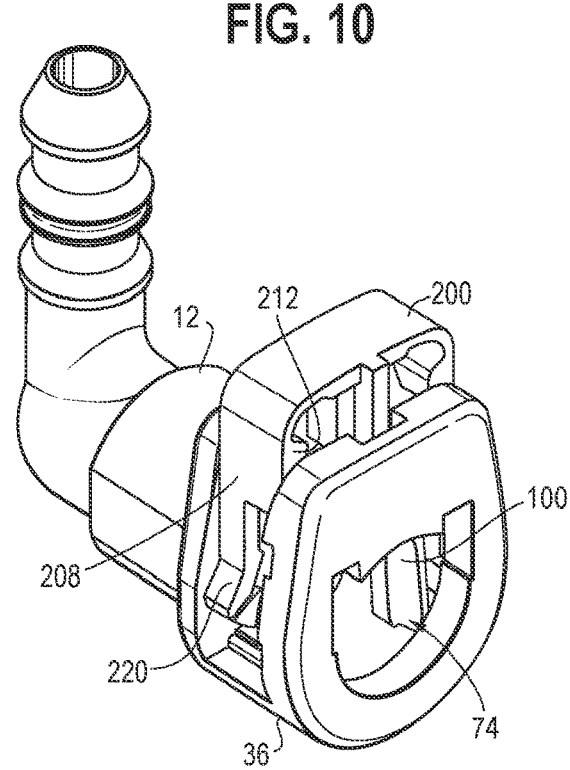
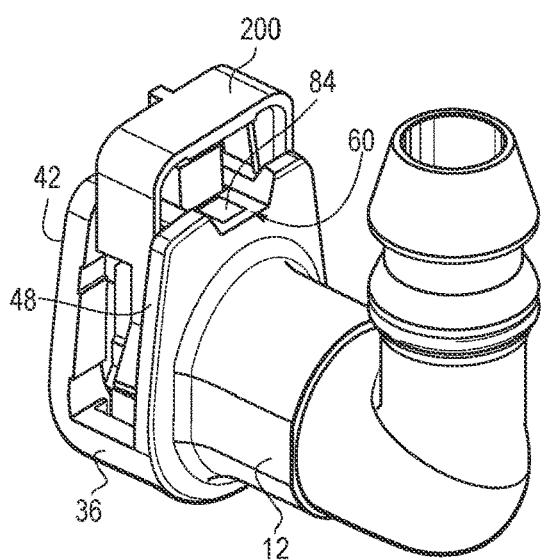
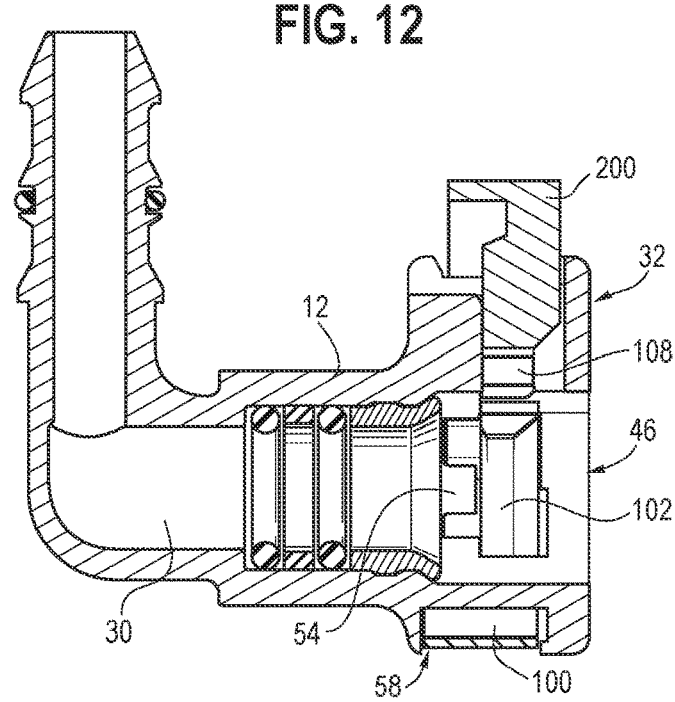

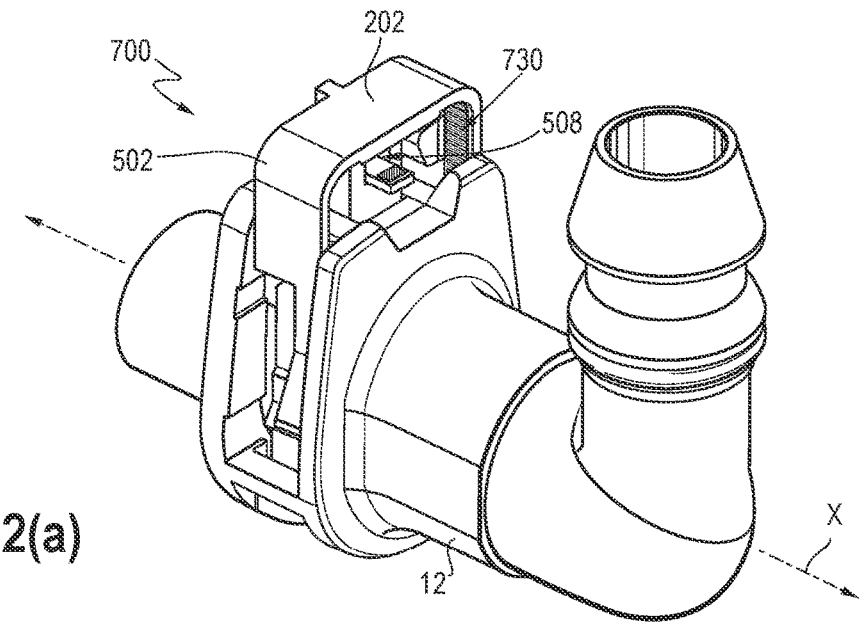
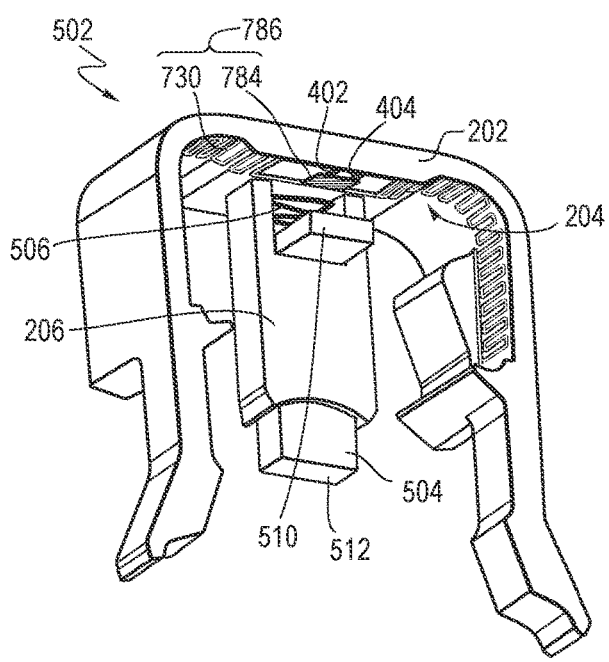
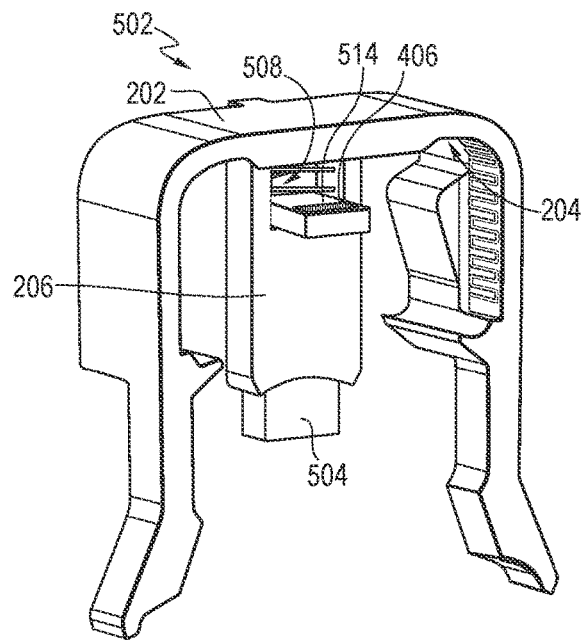

TRANSMITTER FOR QUICK CONNECTOR

CROSS-REFERENCE TO RELATED APPLICATION

This application is a continuation-in-part of U.S. patent application Ser. No. 16/817,085 filed on Mar. 12, 2020, and issued on Feb. 9, 2022 (U.S. Pat. No. 11,262,008), entitled "TRANSMITTER FOR QUICK CONNECTOR," the entire contents of which are incorporated herein by reference.

FIELD

The present disclosure relates to a quick connector coupling for making a releasable connection in a fluid line assembly.

BACKGROUND

The statements in this section merely provide background information related to the present disclosure and may not constitute prior art.

Quick connectors are well-known devices in the automotive and other fields. The quick connector couplings generally include a pipe or tube received and sealingly retained in a connector body of the quick connector. The quick connector couplings are used to provide a fluid connection between two components or conduits, thus establishing a fluid line between the two components.

Use of quick connector for securing a male member and a female connector body is advantageous in that a sealed and secured fluid line may be established with a minimum amount of time and expense. Such quick connector couplings are very useful, for example, in the fluid line systems of internal combustion engine in a vehicle. Furthermore, the reliable and secure quick connector couplings can be used in a brake line system, the fuel line system, and other conduit systems.

To effectively assemble the sealed and secured fluid line, a number of methods and mechanisms for the quick connector are continuously developed and used in various fluid line systems.

SUMMARY

The present disclosure relates to a quick connector for securing a male member in a female connector.

According to one aspect of the present disclosure, a quick connector coupling for making a severable connection with a male member and a female tube in a fluid line includes a connector body having a through bore for receiving the male member having a tubular shape sized to extend into the through bore of the connector body and having an upset, a retainer releasably securing the male member within the connector body, and a verifier including a conductor. The verifier is coupled to the connector body and moves between a verified position and an unverified position inside the connector body. The connector body further includes a radio frequency identification (RFID) chip and an antenna electrically connected to the RFID chip to form a first circuit. In the unverified position of the verifier, the RFID chip sends an unverified signal through the antenna, and when the verifier is moved in the verified position such that the conductor is electrically connected to the RFID chip form a second circuit, the RFID chip sends a verified signal through the antenna.

According to a further aspect of the present disclosure, a RFID tag includes a first wire and a second wire attached to the connector body and each wire electrically connected to the RFID chip in the unverified position of the verifier defined as an unverified state such that the unverified state allows a RFID tag having the RFID chip and the antenna to be read with the unverified signal. The RFID chip is configured to change the unverified signal to the verified signal when the conductor of the verifier contacts the first and second wires in the verified position of the verifier defined as a verified state such that the verified state allows the RFID tag to be read with the verified signal.

According to a further aspect of the present disclosure, the connector body further includes a collar arranged over a seal chamber section of the connector body such that the collar is positioned rearward from a housing section. The antenna is attached around an outer surface of the collar and the RFID chip electrically connected to the antenna is attached to an upper surface of the collar.

According to another aspect of the present disclosure, the quick connector coupling includes a connector body having a through bore for receiving the male member having a tubular shape sized to extend into the through bore of the connector body and having an upset, a retainer releasably securing the male member within the connector body, and a verifier carrying a conductor, an antenna and a radio frequency identification (RFID) chip electrically connected to the antenna. The verifier is coupled to the connector body and moves between a verified position and an unverified position inside the connector body. In the unverified position of the verifier, the RFID chip sends an unverified signal through the antenna, and when the verifier is moved in the verified position such that the conductor is electrically connected to the RFID chip, the RFID chip sends a verified signal through the antenna.

According to a further aspect of the present disclosure, the verifier includes a retainer beam having a channel and further includes a column member moving inside the channel such that a first end of the column member contacts a portion of an inwardly facing surface of the verifier when the verifier is moved to the verified position from the unverified position. Further, the antenna is attached around the inwardly facing surface of the verifier and the RFID chip is attached adjacent to the portion of the inwardly facing surface of the verifier such that the RFID chip electrically connected to the antenna forms a first circuit, and the conductor is attached to a top surface of the first end of the column member resiliently moved inside the channel of the verifier.

According to a further aspect of the present disclosure, a RFID tag includes a first wire and a second wire attached to the inwardly facing surface of the verifier and each wire electrically connected to the RFID chip to form a second circuit in the unverified position of the verifier defined as an unverified state such that the unverified state allows the RFID tag having the RFID chip and the antenna to be read with the unverified signal. In the unverified state, the first circuit of the RFID tag is closed but the second circuit of the RFID tag is open. The RFID chip is configured to change the unverified signal to the verified signal when the conductor of the connector body electrically connects the first and second wires in the verified position of the verifier defined as a verified state such that, in the verified state, the first and second circuits of the RFID tag are closed and the verified state allows the RFID tag to be read with the verified signal.

According to another aspect of the present disclosure, a quick connector coupling for making a severable connection with a male member and a female tube in a fluid line includes a connector body having a through bore for receiving the male member having a tubular shape sized to extend into the through bore of the connector body and having an upset, a retainer releasably securing the male member within the connector body, and a verifier including an antenna and a RFID chip electrically connected to the antenna to form a first circuit. The verifier is coupled to the connector body and moves between a verified position and an unverified position inside the connector body. The connector body further includes a conductor. In the unverified position of the verifier, the RFID chip sends an unverified signal through the antenna, and when the verifier is moved in the verified position such that the conductor is electrically connected to the RFID chip to form a second circuit, the RFID chip sends a verified signal through the antenna.

According to a further aspect of the present disclosure, the conductor is attached to a recess formed in the connector body such that the first and second wires attached to the verifier contact the conductor when the verifier is moved in the verified position from the unverified position. The antenna is formed with a generally helical shape attached to an extension member extending rearward from a connecting member of the verifier and the RFID chip is attached to the extension member adjacent to the antenna.

According to another aspect of the present disclosure, a quick connector coupling for making a severable connection with a male member and a female tube in a fluid line includes a connector body having a through bore for receiving the male member having a tubular shape sized to extend into the through bore of the connector body, a retainer releasably securing the male member within the connector body and comprising a ring extending circumferentially around the connector body, and a verifier comprising an annular body extending circumferentially around the connector body and including an antenna and a RFID chip electrically connected to the antenna to form a first circuit. The verifier is coupled to the connector body and moves between a verified position and an unverified position. Further, the retainer includes a conductor. In the unverified position of the verifier, the RFID chip sends an unverified signal through the antenna, and when the verifier is moved in the verified position such that the conductor is electrically connected to the RFID chip to form a second circuit, the RFID chip sends a verified signal through the antenna.

According to a further aspect of the present disclosure, the antenna is attached around an outer surface of the annular body of the verifier, the RFID chip is attached to a top surface of the verifier, and the conductor is attached to a portion of an inner surface of the retainer. The retainer having the conductor allows the verifier to slidably move around the connector body along a longitudinal axis of the connector body when the male member is securely inserted into the connector body. The verifier further includes at least one finger extending forward from the annular body along the longitudinal axis and the antenna includes a first wire and a second wire extending over the at least one finger of the verifier and each being electrically connected to the RFID chip.

According to a further aspect of the present disclosure, the finger of the verifier having the first and second wires slidably moves inside the retainer ring when the verifier is moved to the verified position from the unverified position along the longitudinal axis such that the first and second wires of the antenna contact the conductor attached to the portion of the inner surface of the retainer and the RFID chip is configured to change the unverified signal to the verified signal.

Further details and benefits will become apparent from the following detailed description of the appended drawings. The drawings are provided herewith purely for illustrative purposes and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 10 shows a perspective view of the quick connector including the retainer and the verifier in an unlatched position of the verifier of FIG. 1;

FIG. 11 shows a different perspective view of the quick connector including the retainer and the verifier in the unlatched position of the verifier of FIG. 10;

FIG. 12 shows a side sectional view of the quick connector including the retainer and the verifier in the unlatched position of the verifier of FIG. 10;

FIG. 22 shows a perspective view of a quick connector coupling in accordance with another form of the present disclosure, FIG. 22(a) shows a perspective bottom view of a verifier of the quick connector of FIG. 22, and FIG. 22(b) shows a perspective top view of the verifier of the quick connector of FIG. 22;

Figure 1:
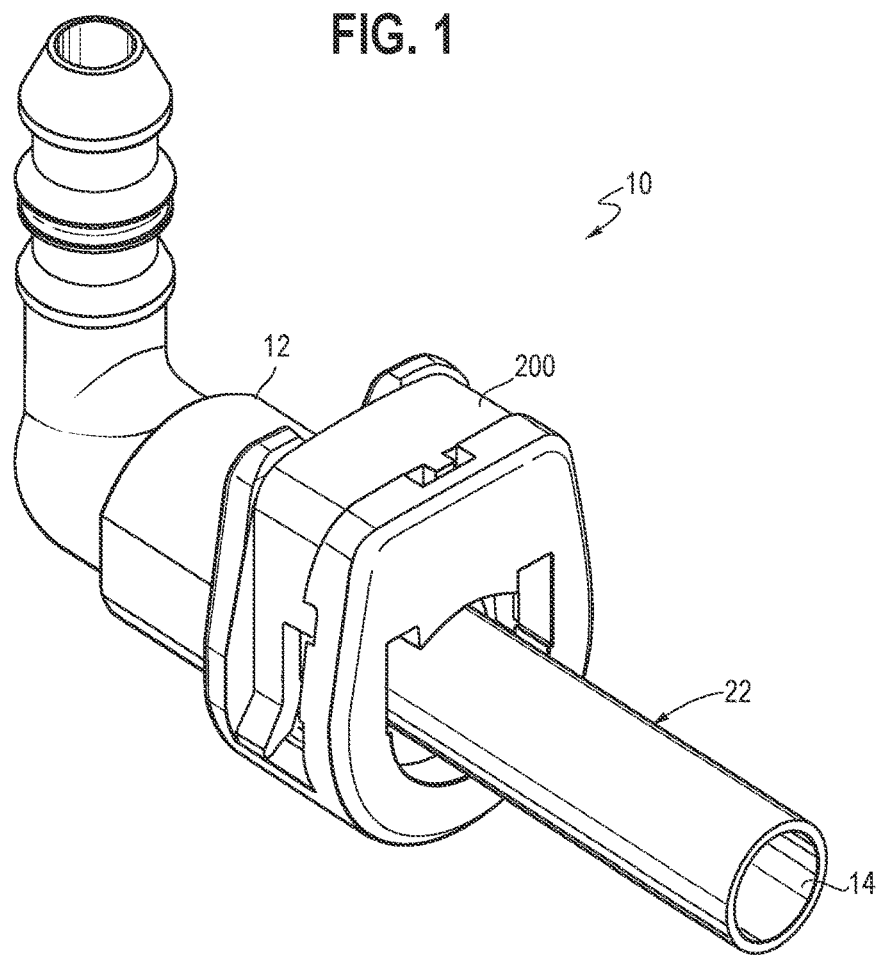
FIG. 1 shows a perspective view of a quick connector coupling in accordance with an exemplary form of the present disclosure.

The drawings described herein are for illustration purposes only and are not intended to limit the scope of the present disclosure in any way.

DETAILED DESCRIPTIONS

The following description is merely exemplary in nature and is in no way intended to limit the present disclosure or its application or uses. It should be understood that throughout the drawings, corresponding reference numerals indicate like or corresponding parts and features.

A quick connector coupling of the present disclosure is illustrated in connection with a fluid line assembly. It is shown as a releasable connection between a rigid tube and other fluid carrying components, particularly a flexible hose. However, the quick connector couplings have numerous other applications where a fluid tight, but releasable connection is desired, such as connection of rigid elements of a fluid path, whether pressurized or unpressurized in an automotive vehicle.

Figure 2:
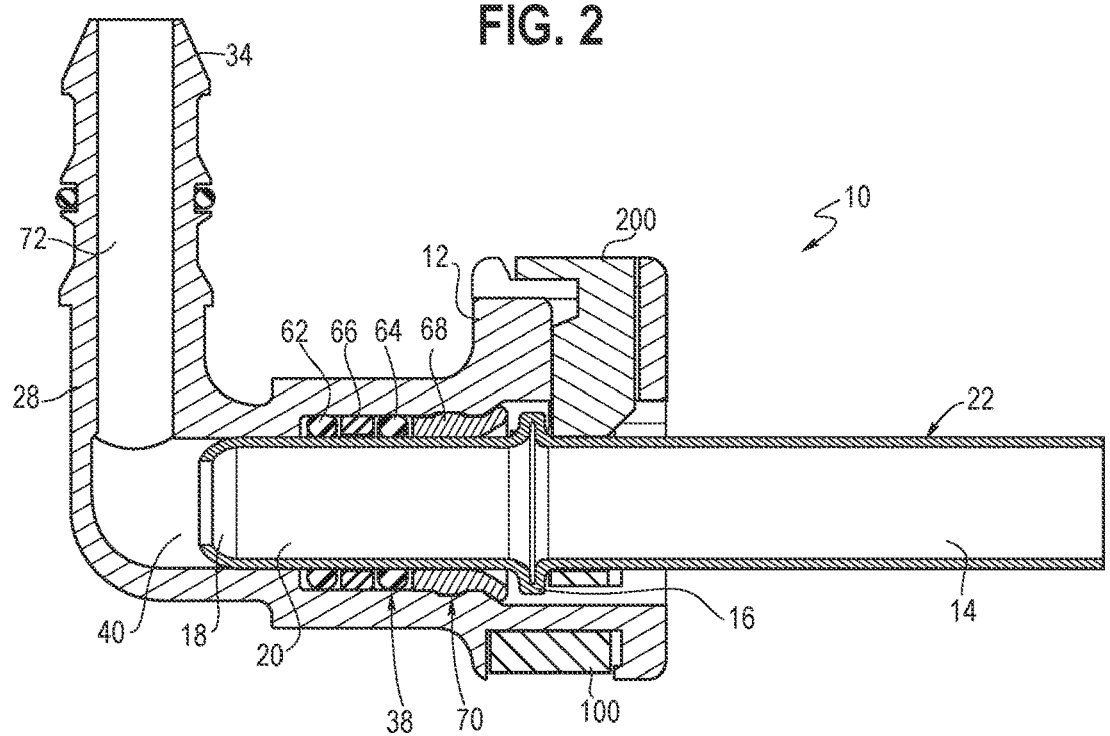
FIG. 2 shows a side sectional view of the quick connector coupling of FIG. 1.

Referring to more detail in the drawings, FIG. 1 illustrates a quick connector coupling 10 for forming a severable connection in a fluid line. The quick connector coupling 10 is comprised of a connector body 12 and a male member 14. In FIG. 2, the quick connector coupling 10 is releasably secured together by a retainer 100 (e.g., a primary latch) and a verifier 200 (e.g., a secondary latch). The male member 14 is formed at an end of a hollow tube which forms a part of a fluid line system. The connector body 12 and the male member 14 are connectable to form a severable joint in the fluid line.

As shown in FIGS. 1 and 2, the male member 14 is formed at the end of a rigid tube. The male member 14 includes a radially enlarged upset 16 formed a given distance from an open tube end or tip 18. The tube end or tip 18 can be rounded or tapered to make insertion of the male member 14 into the connector body 12. A smooth generally cylindrical sealing surface 20 defined by the exterior surface of the tube extends between the upset 16 and the tube end or tip 18. The tube continues in a direction away from the tube end beyond the upset 16 and defines a generally smooth cylindrical surface 22. The smooth cylindrical surface 22 has generally same diameter as the cylindrical sealing surface 20.

Figure 3:
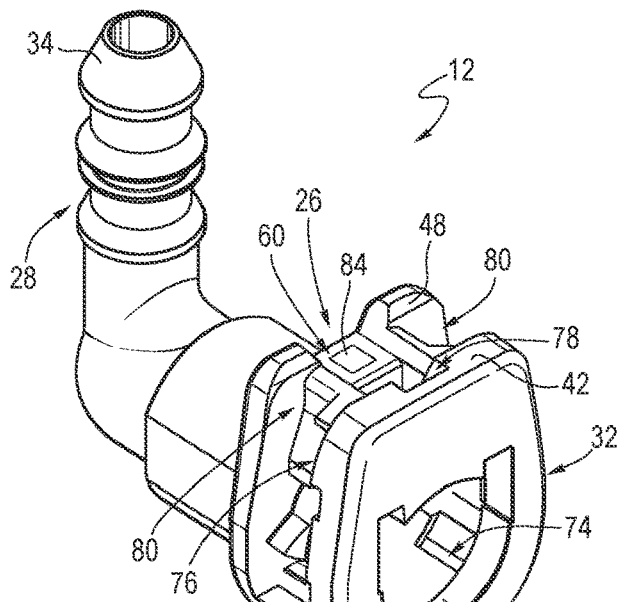
FIG. 3 shows a perspective view of a female connector body of FIG. 1.
Figure 4:
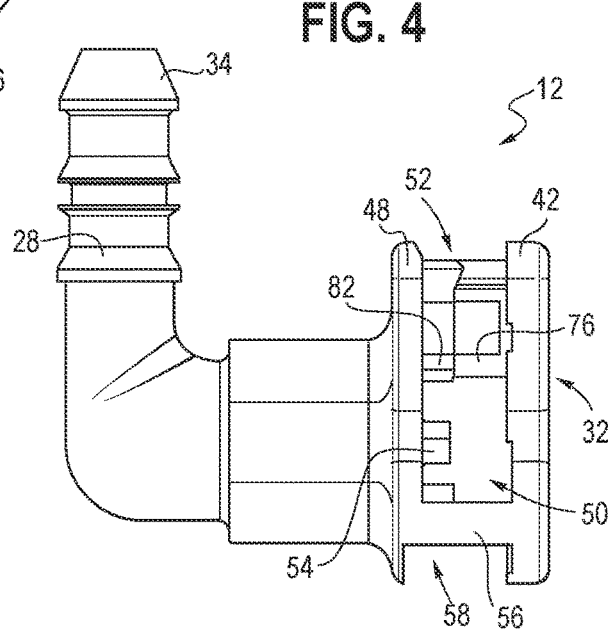
FIG. 4 shows a side view of the female connector body of FIG. 3.
Figure 5:
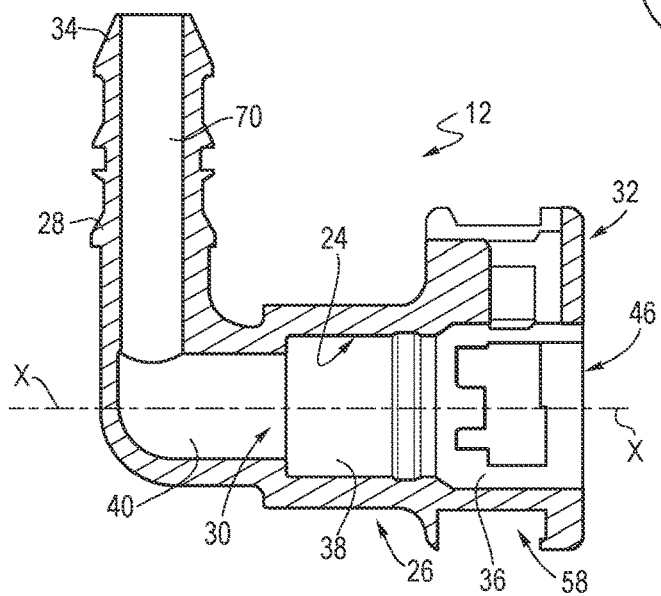
FIG. 5 shows a side sectional view of the female connector body of FIG. 3.

FIGS. 3-5 illustrate the female connector body 12 in detail. As shown in FIG. 3, the connector body 12 is defined by a generally cylindrical, stepped radially inner surface of wall 24, and includes a main body 26 for receiving the male member 14 and a cylindrical stem 28 extending from the main body 26 as a single unit. The cylindrical stem 28 including a hose connection end 34 is angled by 90 degrees, which is a transverse direction from a longitudinal axis X of the main body 26. In accordance with other forms of the present disclosure, however, the cylindrical stem 28 including the hose connection end 34 may extend from the main body 26 with a straight shape (180 degrees, see FIG. 6) along the longitudinal axis X. Accordingly, it must be understood that the exterior of the connector body 12 may take any desired shape without departing from the present disclosure.

The connector body 12 including the main body 26 and the cylindrical stem 28, as a single unit, is generally formed of a plastic material (e.g., polyamide). As shown in FIG. 5, the inner surface of the wall 24 defines a through bore 30 centered about the longitudinal axis X. The through bore 30 of the connector body 12 extends completely through the connector body 12 from a male member reception end 32 to the tube end receptacle 40 along the longitudinal axis X, and further transversely extends to the hose connection end 34. It should be noted that the term rearward is used herein to mean in a direction from the male member reception end 32 toward the tube end receptacle 40 generally along the longitudinal axis X, and the term forward is a reversed direction from the direction of the rearward along the longitudinal axis X.

As shown in FIGS. 3-5, the connector body 12 includes a housing section 36, a seal chamber 38, a tube end receptacle 40, and the stem 28. The housing section 36 is adjacent to the male member reception end 32. The housing section 36 is defined by a forward rim 42 having a transverse planar forward facing surface 44 that defines an opening 46 to the through bore 30 at the male member reception end 32, and a rearward rim 48 spaced from the forward rim 42 separated by a gap or space 50 opened to the through bore 30. Both forward and rearward rims 42 and 48 are connected by a top support member 52 and a bottom support member 56. In addition, center body posts 54 extend from a forward facing surface of the rearward rim 48. The lower curved surface of the bottom support member 56 is recessed radially inward from the radially outward most edge of the rearward rim 48 so that the bottom support member 56 and the forward and rearward rims 42 and 48 defines a pocket 58 that receives a cross member 104 of a retainer 100.

As shown in FIG. 3, for example, the top support member 52 is connected between the forward and rearward rims 42 and 48. A top portion of the rearward rim 48 includes a recess 60 that receives an inwardly facing surface 204 of a verifier 200. The recess 60 of the rearward rim 48 is disposed in the top support member 52. The connector body 12 includes a radio frequency identification (RFID) chip 84 which is included in a part of a radio frequency identification (RFID) tag 86 with an antenna 230. The chip 84 is located in the top portion of the connector body 12, and the chip 84 is generally attached to the connector body 12. For example, the chip 84 is printed or embedded in the rearward rim 48 of the housing section 36. However, the chip 84 may be attached to other locations of the connector body 12 according to the operation of the quick connector coupling 10. In accordance with an exemplary form of the present disclosure, as shown in FIG. 3, the chip 84 is attached to the recess 60 of the rearward rim 48 by molding with the connector body 12 or printing on the recess 60 of the housing section 36. In addition, the chip 84 may be attached to other components such as the verifier 200 or the retainer 100 described later in accordance with other forms of the present disclosure.

In general, the RFID tag 86 includes an active RFID tag or a passive RFID tag. For example, in FIG. 9, the RFID tag 86 including the chip 84 and the antenna 230 is a passive RFID tag in accordance with an exemplary form of the present disclosure. The passive RFID tag 86 generally requires no power supply. This type of the passive RFID tag is able to react to change in distance, strain, pressure, and other environmental factors. Accordingly, as shown in FIGS. 1 and 2, when the verifier 200 is moved in the latched position, the passive RFID tag 86 is able to react by contacting the chip 84 to the antenna 230. In accordance with other forms of the present disclosure, however, the RFID tag 86 may be an active RFID tag. The active RFID tag includes a power supply and actively sends a signal without reacting to other environmental factors. Accordingly, the active RFID tag may send a signal by itself.

Figure 19A:
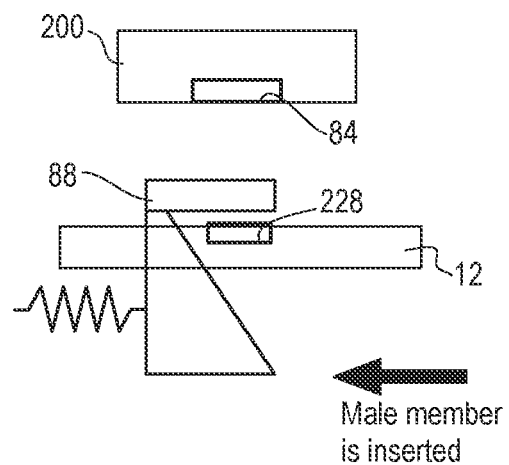
FIGS. 19(a) and 19(b) show a brief diagram illustrating a blocking material incorporated in the quick connector coupling of the present disclosure.
Figure 19B:
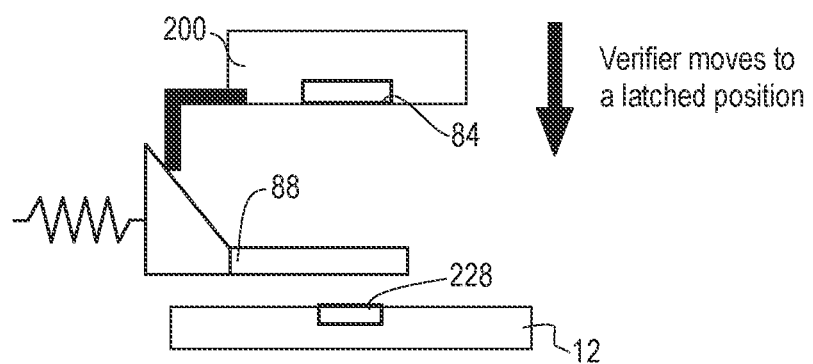

In accordance with a further aspect of the present disclosure, the quick connector coupling incorporates a blocking material 88 between the RFID chip 84 and the contact point 228 of the antenna 230 to shield any signal from the RFID chip 84 when the male member is not inserted in one approach as shown in FIG. 19(*a*). The blocking material 88 is moved out of the way as the male member is inserted to expose the RFID chip (or an inductive chip) 84 or the contact point 228 of the antenna 230 is moved in the latched position so that the RFID chip 84 is able to communicate with the antenna 230 when the verifier is in the latched position. In another approach, as shown in FIG. 19(*b*), a blocking material 88 shields the RFID tag 86 including the RFID chip 84 and the antenna 230 for preventing a wrong signal from the RFID chip through the antenna from being read in the server before the verifier is moved to the latched position. Accordingly, the blocking material 88 covering the RFID chip (or being located between the RFID chip and the contact point of the antenna) or the RFID tag (including RFID chip and the antenna) prevents a wrong signal when the male member is not inserted into the connector body or the verifier is not fully engaged with the connector body such that the verifier is in the unlatched position.

The seal chamber 38 is formed axially rearward of the housing section 36. It is defined by a reduced diameter portion of the wall 24, relative to the housing section 36. The seal chamber 38 is provided to house sealing elements to form a fluid seal between the connector body 12 and the male member 14. As shown in FIG. 2, two O-ring seals 62 and 64 separated by a rigid spacer ring 66 are radially situated between the seal chamber 38 and the male member 14. The O-ring seals 62 and 64 are sized to fit tightly within the seal chamber 38 and tightly around the sealing surface 20 of the male member 14. The O-ring seals 62 and 64 are secured in the seal chamber 38 by a hollow spacer sleeve 68. The hollow spacer sleeve 68 includes a raised annular portion 70 on the outer periphery of the sleeve 68 for providing enhanced securement of the spacer sleeve 68 within the through bore 30.

The tube end receptacle 40 is formed axially rearward of the seal chamber 38. It is defined by a reduced diameter portion of the wall 24, relative to the seal chamber 38, which extends axially rearward. The tube end receptacle 40 is sized to receive and pilot or guide the sealing surface 20 of the male member 14. Furthermore, the stem 28 includes a fluid passageway 72 defined by the smallest diameter portion of the wall 24. It leads transversely from the small diameter of the tube end receptacle 40 to the hose connection end 34. The stem 28 is configured to facilitate connection to another component in the fluid line. For example, the connector body 12 is formed for connection to a flexible hose (not shown). As previously described, any other suitable connection arrangement may be used to complete a fluid line system.

Figure 7:
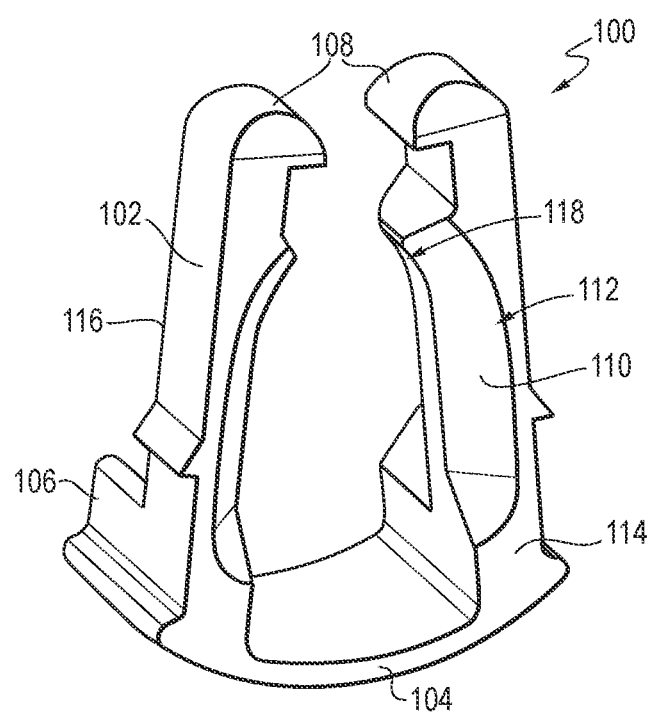
FIG. 7 shows a perspective view of a retainer of FIG. 1.

FIG. 7 illustrates the retainer 100 in the quick connector coupling 10. It is preferably formed of a resilient, flexible material such as plastic. The retainer 100, which extends transversely through bottom slots 74 of the housing section 36, is demountably coupled to the connector body 12. The retainer 100 includes a pair of elongated, generally parallel legs 102 extending from, and joined at one end by, a cross member 104. Released protrusions 106 are formed on the radially inner surface of the cross member 104 and extend axially from the rearward face of the legs 102. The cross member 104 provides a separation between the legs 102 approximately equal to the outer diameter of the cylindrical sealing surface 20 of the male member 14. The legs 102 have an axial length approximately equal to, but slightly less than the axial length of the bottom slots 74 in the housing section 36. The lateral width of legs 102 is significantly less than the lateral width of the bottom slots 74 in order to allow outward expansion of the legs 102 to permit the male member insertion and release as will be understood. In addition, the cross member 104 has an axial length substantially greater than that of the legs 102.

Each leg 102 includes a latch 108 formed at an end remote from the cross member 104. When the retainer 100 is fully inserted into the connector body 12, the latches 108 lock the retainer 100 into a position relative to the connector body 12. The latches 108 engage locking shoulders 76, defined by the top support member 52 of the connector body 12, to releasably lock the retainer 100 in place. As shown in FIG. 7, each leg 102 further includes an angled surface 110 with lead areas 112. The lead areas 112 are formed into the forward faces 114 of the legs 102. The lead areas 112 slope radially inward and axially rearward from the forward face 114 of each leg 102, and terminate approximately midway between the forward face 114 and the rearward face 116 of each leg 102.

The spacing between the lead edges of the lead areas 112 is at its greatest adjacent the forward face 114. The spacing is approximately equal to the outer diameter or outer surface of the upset 16 formed on the male member 14. At the inner edges 118 of the lead areas 112 is approximately equal to the outer diameter of the sealing surface 20 of the male member 14. Portions of the lead areas 112 closer to the latches 108 curve inwardly to match the annular profile of the male member upset 16. This shape assists in guidance and centering of the male member 14 through the connector body 12.

Figure 8:
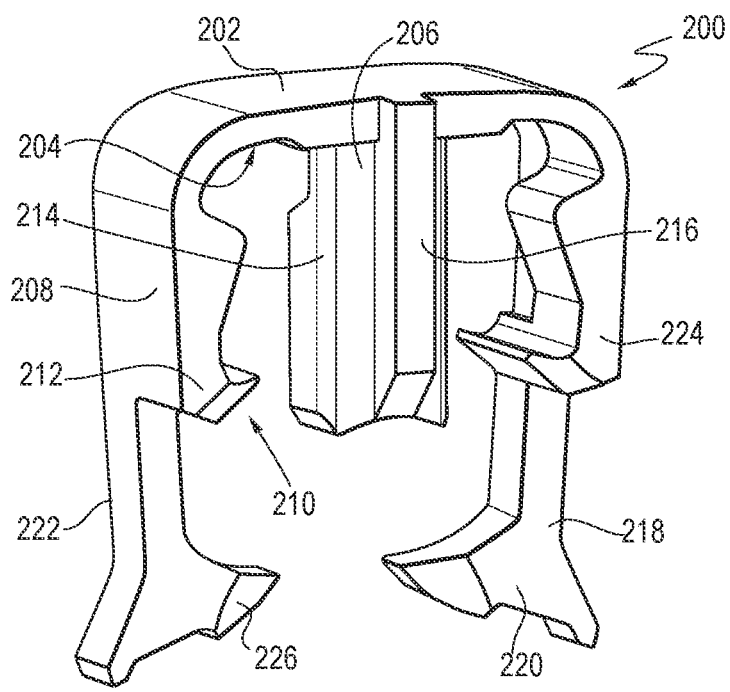
FIG. 8 shows a perspective view of a verifier of FIG. 1.

FIG. 8 illustrates the verifier 200 including elements positioned within a top slot 78 and side slots 80. The verifier 200 is demountably coupled to the connector body 12. The verifier 200 is also preferably molded of a resilient and flexible material such as a plastic. The verifier 200 is slidable transversely of the connector body 12 relative to the top support member 52 toward and away from the curved bottom support member 56 and consequently the retainer 100 between a radially latched position and a radially unlatched position.

The verifier 200 includes a connecting member 202 with a radially inward facing surface 204 from which extend a retainer beam 206 and a pair of laterally spaced curved generally resilient fingers 208 extending downward from the connecting member 202 and in the same direction as the retainer beam 206. When assembled to the connector body 12, inwardly facing surface 204 generally overlies the top slot 78 of the connector body 12 with the retainer beam 206 slidably disposed in the top slot 78. Each finger 208 resides in one of the side slots 80.

Each finger 208 includes a knuckle 210 having a laterally inward directed hook 212. The hooks 212 of the finger 208 engage locking ridges 82 defined by the top support members 52 to releasably secure the verifier 200 to the connector body 12 when the verifier 200 is in its unlatched position. The retainer beam 206 of the verifier 200 includes a laterally enlarged portion 214 and a narrowed portion 216. The lateral width of the enlarged portion 214 is slightly less than the lateral width of the enlarged portion of the top slot 78 formed on the top support member 52, and the lateral width of the narrowed portion 216 is slightly less than the lateral width of the narrowed portion of the top slot 78 so that the verifier 200 moves between the latched position and the unlatched position.

As shown in FIG. 8, each finger 208 of the verifier 200 further includes an extension beam 218 extending from the end of the knuckle 210 and terminating at a verifying tab 220 formed at its free or distal end. The rearward faces 222 of the extension beams 218 and the verifying tabs 220 are planar with the rear surfaces of the knuckles 210. However, the forward faces 224 of the extension beams 218 and the verifying tabs 220 are spaced axially rearward from the forward face of the knuckles 210 such that the axial thickness of the extension beam 218 and the verifying tab 220 is less than the axial thickness of the knuckle 210. The difference between the thickness of the extension beams 218 and the verifying tabs 220 and the thickness of the knuckle 210 is such that it is at least as large as the thickness or axial length of the upset 16 of the male member 14.

Each verifying tab 220 includes a lead-in ramp surface 226 formed into the forward face 224 of the verifying tab 220. The lead-in ramp surface 226 slopes radially inward and axially rearward from the forward face 224 of each verifying tab 220. The shape and the spacing of the lead-in ramp surfaces 226 match the annular profile of the upset 16 of the male member 14 allowing the upset 16 to contact the lead-in ramp surface 226 upon insertion of the male member 14 into the connector body 12 when the verifier 200 is in its unlatched position. Accordingly, the spacing between opposing verifying tabs 220 is greater than spacing necessary for the cylindrical sealing surface 20 to be inserted into the connector body 12 without contacting the verifying tab 220 when the verifier 200 is in the unlatched position. In the assembled configuration, the verifying tab 220 is shaped and sized to engage the center body posts 54 of the connector body 12 such that the verifier 200 is moved in the latched position from the unlatched position.

Figure 9:
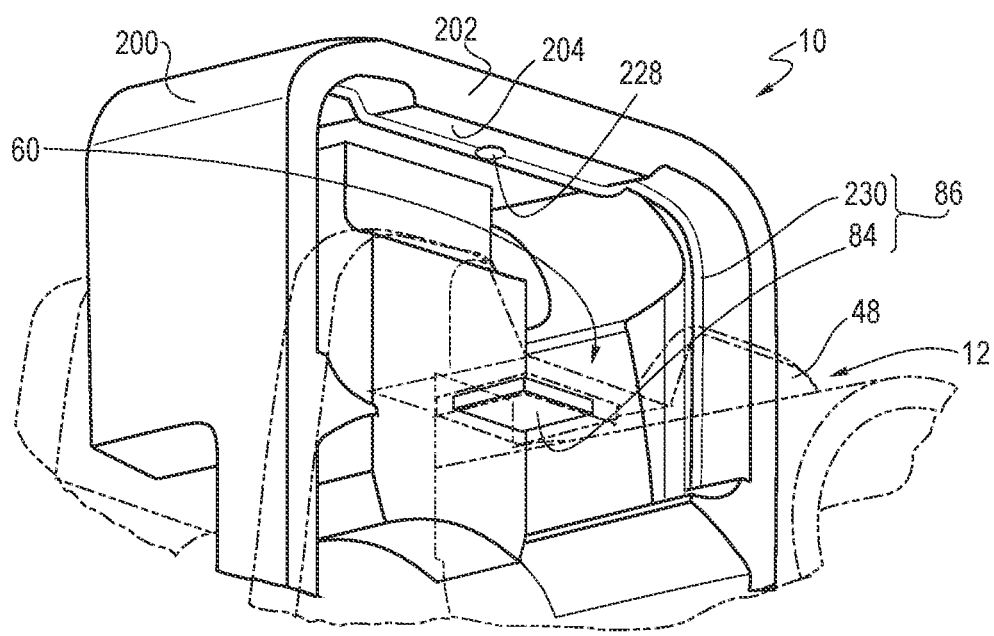
FIG. 9 shows a detailed view of a top portion of the quick connector coupling in an unlatched position of the verifier of FIG. 1.

Referring to FIG. 9, the verifier 200 further includes the antenna 230 having a contact point 228 for contacting the chip 84 on the connector body 12. The antenna 230 is generally attached to the verifier 200. As shown in FIG. 9, for example, the antenna 230 is embedded into the radially inward facing surface 204 of the verifier 200. In particular, the contact point 228 on the antenna 230 is positioned at a location that is faced and contacted to the chip 84 of the connector body 12 when the verifier 200 is moved in the latched position. As shown in FIG. 9, for example, the contact point 228 is located in the middle area of the radially inward facing surface 204 of the verifier 200, which is faced to the chip 84 attached to the recess 60 of the connector body 12. In addition, the antenna 230 is attached (or embedded) around the inward facing surface 204 and includes the contact point 228 for activating a signal transferred from the chip 84.

In particular, the location of the contact point 228 and the antenna 230 may be changed according to the location of the chip 84 of the connector body and/or the structure of the connector body 12. Furthermore, the antenna 230 having the contact point 228 may be attached to the other components such as the connector body 12 or the retainer 100 described later in accordance with other forms of the present disclosure.

In accordance with other forms of the present disclosure, an inductive chip may be used for wirelessly communicating with the antenna 230 without contacting (or touching) each other. For example, when the inductive chip attached to the connector body or the verifier is brought close to the antenna 230 (but not necessarily touching or contacting), the signal from the RFID tag 86 is enabled to read in the server because the read range of the inductive chip serves to identify a closed (contacted or touched) condition. Accordingly, the inductive chip in the RFID tag 86 wirelessly communicates with the antenna 230 that enables the signal from the RFID tag 86 to read in the server when the verifier 200 is moved in the latched position.

FIGS. 10, 11 and 12 illustrate the connector body 12 with the installed the retainer 100 and the verifier 200 in the unlatched position of the verifier 200. The legs 102 of the retainer 100 is inserted into the bottom slots 74 in the housing section 36, and the cross member 104 is placed in the pocket 58 of the housing section 36. When the legs 102 are inserted into the housing section 36, the legs 102 spring inward with the latches 108 engaged with the locking shoulders 76 of the top support member 52 to secure the retainer 100 to the connector body 12. When the retainer 100 is secured in the connector body 12, furthermore, the lead areas 112 of the legs 102 face to the male member reception end 32.

The coupling is completed by positioning the verifier 200 into the latched position from the unlatched position. In the unlatched position, the verifier 200 is restrained from axially and radially moving relative to the connector body 12. The abutting relationships of the forward and rearward faces of the knuckles 210 with both forward and rearward rims 42 and 48 restrain the verifier 200 from the axial movement inside the housing section 36. The engagements of the hooks 212 of the fingers 208 with the locking ridges 82 of the top support member 52 restrain the verifier 200 from radially inward or transversely upward movement. In addition, the abutting relationships of the verifying tabs 220 with the center body posts 54 restrain the verifier 200 from radially outward or transversely downward movement. Accordingly, in this condition, the verifier 200 cannot be moved from the unlatched position.

With the retainer 100 and the verifier 200 properly attached to the connector body 12 in the unlatched position, as shown in FIGS. 1 and 2, the male member 14 is then inserted into the connector body 12. The cylindrical sealing surface 20 of the male member 14 passes between the legs 102 and into the seal chamber 38. When the upset 16 of the male member 14 contacts the legs 102, the lead areas 112 of the legs 102 permit passage of the upset 16 between the legs 102 upon applying sufficient axial inward force. As the upset 16 passes between the legs 102, it rides along the lead areas 112 and flexes the legs 102 radially outward. Once the upset 16 has passed the legs 102, the legs 102 springs back into place behind the upset 16 to a locked position. The rearward face 116 of the legs 102 abut the upset 16 to prevent subsequent inadvertent withdrawal of the male member from the connector body 12. In addition, the male member 14 is withdrawn from the connector body 12 by inwardly pushing on the cross member 104 of the installed retainer 100.

With the legs 102 of the retainer 100 in the locked position, the upset 16 flexes the fingers 208 of the verifier 200 laterally outward in side slots 80. Since the verifying tabs 220 are located transversely above the axis X of the through bore 30, and likewise above the axis X of the male member 14, the upper hemisphere of the upset 16 contacts the lead-in ramp surfaces 226 of the fingers 208 when the male member 14 is inserted rearward into the connector body 12. Contacting the upper hemisphere of the upset 16 with the fingers 208 not only applies a rearward directed force on the fingers 208, but it also apply a upwardly directed force on the fingers 208 pushing the verifier 200 transversely upward, or radially outward away from the axis X of the male member 14, allowing the verifying tabs 220 to clear the center body post 54 so that the fingers 208 are able to spread radially or laterally outward, without interference.

As described above, the fingers 208 of the verifier 200 are able to spread laterally outward only after the upset 16 of the male member 14 has completely passed the legs 102 of the retainer 100 (that is, the male member 14 is fully inserted into the connector body 12 and the legs 102 of the retainer 100 is in the locked position). The quick connector coupling 10 is completed by positioning the verifier 200 to the latched position with a transversely downward or radially inward force on the connecting member 202 (toward the connector body 12) when the male member 14 is fully inserted into the connector body 12. In the latched position, the rear surface of the retainer beam 206 is in axial abutting relationship with the upset 16 of the male member 14. This axial abutting relationship between the retainer beam 206 and the upset 16 provides the verifier 200 with the verifier feature to retain the male member 14 in the connector body 12 when the retainer 100 is failed to lock the male member 14. Also, the radially inner surface of the retainer beam 206 abuts the outer surface of the male member 14. This ability of the verifier 200 to move radially inward to the latched position provides visual verification to the user that the male member 14 has been properly inserted into the connector body 12.

In addition to providing the visual verification as described above, the verifier 200 of the present disclosure is also able to send a signal to a receiver for providing verification that the male member 14 has been properly inserted into the connector body 12. Since the recess 60 on the top portion of the connector body 12 is shaped to match the inward facing surface 204 of the verifier 200, upon moving the verifier 200 in the latched position, the contact point 228 of the antenna 230 in the verifier 200 abuts the chip 84 of the connector body 12. This abutment of the verifier 200 and the connector body 12 enables the signal from the RFID tag 86 by connecting the chip 84 to the contact point 228 of the antenna 230. A receiver (not shown) is positioned near where the verifier 200 is inserted into the connector body 12. The receiver receives the enabled signal from the RFID tag 86, and sends another signal to a control unit (not shown) for providing notification that the quick connector coupling 10 has been properly connected. Furthermore, the RFID tag 86 includes a built-in impedance matching feature. By utilizing the built-in impedance matching feature with the chip 84, the signal from the RFID tag 86 is maximized and effectively enabled to read the signal in the server.

In the unlatched position of the verifier 200, since the contact point 228 of the antenna 230 does not contact (or touch) the chip 84 of the connector body 12 as described above, the signal from the RFID tag 86 is not enabled. Accordingly, the receiver does not receive the signal from the RFID tag 86 and the control unit will not receive another signal to acknowledge that the coupling 10 was properly connected.

Figure 13:
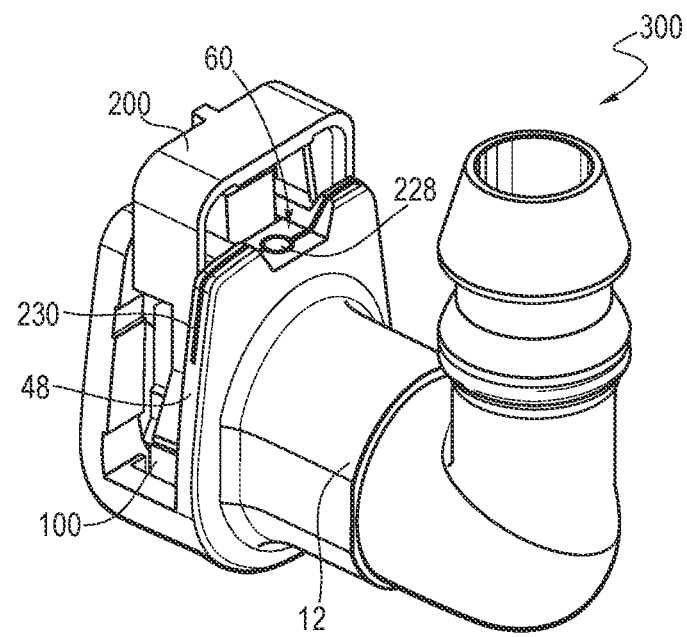
FIG. 13 shows a perspective view of a quick connector in accordance with another form of the present disclosure.
Figure 14:
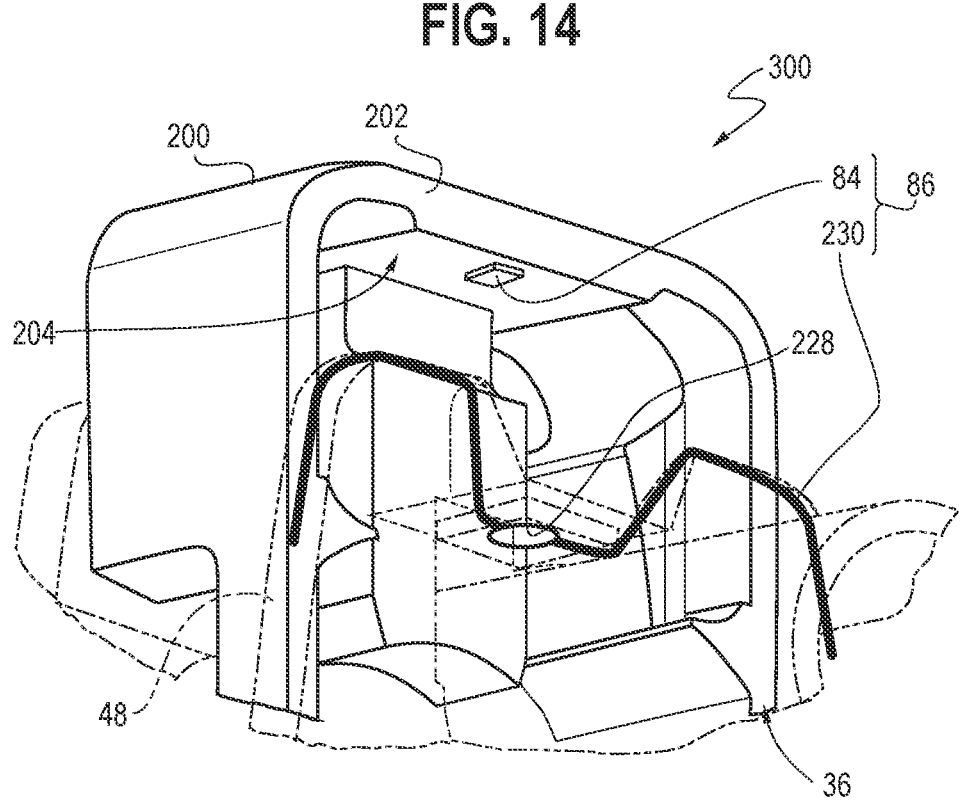
FIG. 14 shows a detailed view of a top portion of the quick connector coupling in an unlatched position of a verifier of FIG. 13.

A second embodiment of a quick connector coupling 300 in accordance with another form of the present disclosure is illustrated in FIGS. 13 and 14. The quick connector coupling 300 of the second embodiment is essentially the same as the quick connector coupling 10 described above with exception of the location of the chip 84 and the antenna 230 having the contact point 228. In the second embodiment, for example, the chip 84 is attached to the verifier 200, and the antenna 230 having the contact point 228 is attached (or embedded) to the connector body 12.

As shown in FIGS. 13 and 14, the chip 84 is attached to the radially inward facing surface 204 of the verifier 200 by molding or printing process as described above. The antenna 230 having the contact point 228 is attached to the connector body 12. In particular, the contact point 228 of the antenna 230 is located in the recess 60 of the rearward rim 48 so that the contact point 228 of the antenna 230 abuts the chip 84 when the verifier 200 moves in its latched position. In addition, the antenna 230 having the contact point 228 is attached (or embedded) around an outer edge of the rearward rim 48 of the connector body 12. Accordingly, when the chip 84 of the verifier 200 contacts (or touches) the contact point 228 of the antenna 230 attached to the connector body 12 in the latched position of the verifier 200, the signal in the RFID tag 86 is enabled so that the receiver receives the signal from the RFID tag 86 and sends another signal to the control unit for providing notification that the quick connector coupling 300 has been properly connected.

Figure 15:
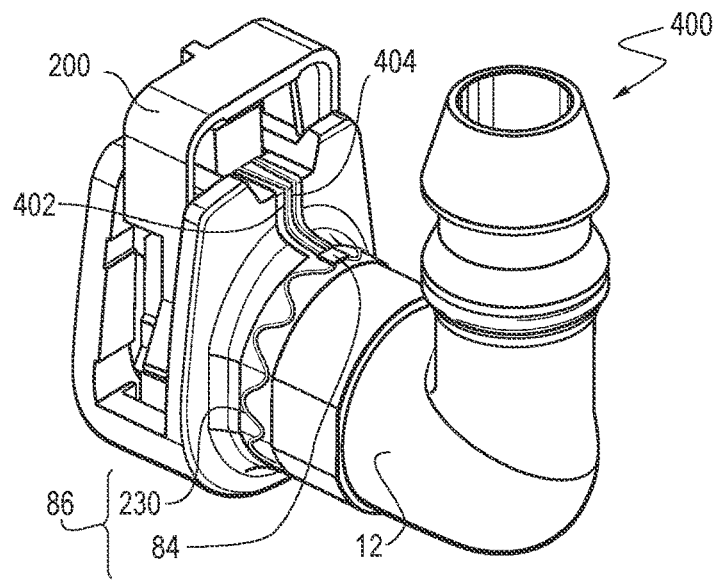
FIG. 15 shows a perspective view of a quick connector in accordance with another form of the present disclosure.
Figure 16A:
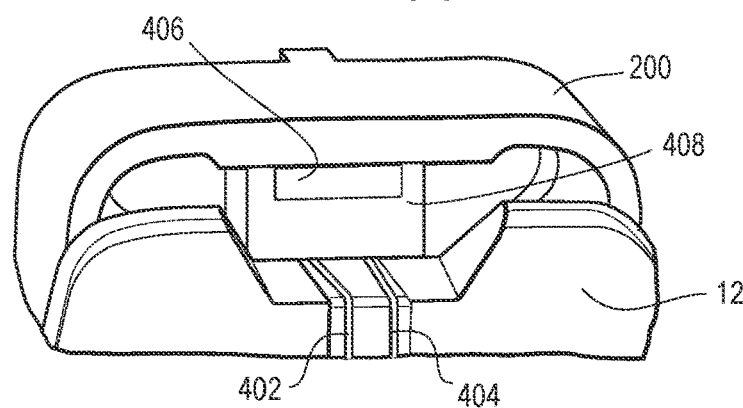
FIG. 16(a) shows a detailed view of the quick connector coupling in an unlatched position of a verifier of FIG. 15
Figure 16B:
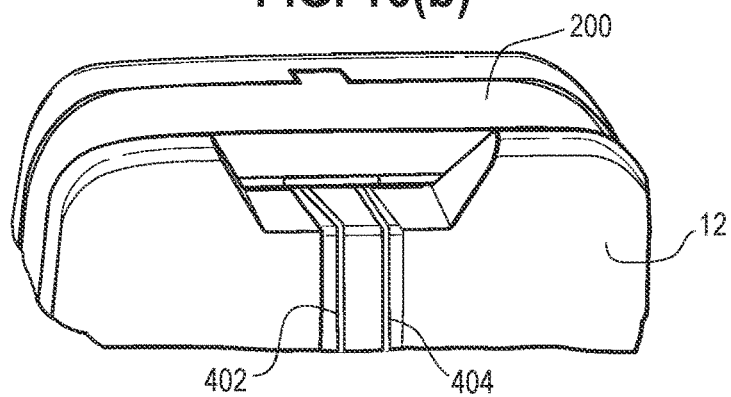
FIG. 16(b) shows a detailed view of the quick connector coupling in a latched position of the verifier of FIG. 15.

A third embodiment of a quick connector coupling 400 in accordance with another form of the present disclosure is illustrated in FIGS. 15, 16(a) and 16(b). The quick connector coupling 400 of the third embodiment is essentially the same as the quick connector coupling 300 described above with exception of the arrangements of the RFID tag 86 including the chip 84 and the antenna 230. As shown in FIG. 15, the chip 84 and the antenna 230 are attached to the outer surface of the seal chamber 38 in the connector body 12. The antenna 230 is disposed around the outer surface of the seal chamber 38, and the chip 84 is directly attached to the antenna 230 and disposed on the top surface of the seal chamber 38. In addition, the antenna 230 includes a first wire 402 and a second wire 404 attached to the chip 84, and the first and second wires 402 and 404 are attached to the connector body 12. However, in the third embodiment of the present disclosure, the antenna 230 is not enabled to send the signal from the RFID tag 86 because the antenna 230 is electrically disconnected while the verifier 200 is in the unlatched position even though the chip 84 is attached to the antenna 230. Accordingly, the signal from the RFID tag 86 is not enabled to read by the server which is remotely located so that the control unit recognizes that the verifier 200 is in the unlatched position.

As shown in FIG. 16(*a*), a conductor 406 is attached to the verifier 200. For example, the conductor 406 is formed as a conductive material such as a copper strip for electrically connecting the first wire 402 and the second wire 404 in the antenna 230. The conductor 406 is attached to the upper area on the rear face surface 408 of the retainer beam 206 for electrically connecting both wires 402 and 404. When the verifier 200 is moved in the latched position after the male member 14 is inserted into the connector body 12 and locked by the retainer 100, the antenna 230 and the chip 84 are electrically connected and the antenna 230 is enabled to send the signal because both wires 402 and 404 are electrically connected by the conductor 406. In accordance with other forms of the present disclosure, the conductor 406 in the verifier 200 may be located in other areas according to the location of the first and second wires 402 and 404 attached to the connector body 12.

As shown in FIG. 16(*b*), when the verifier 200 is moved in the latched position, the antenna 230 is able to send the signal from the RFID tag 86 to the server remotely located. Accordingly, the receiver (not shown) receives the signal from the RFID tag 86 and sends another signal to a control unit (not shown) for providing notification that the verifier 200 is in the latched position and the quick connector coupling 400 has been properly connected.

Figure 17:
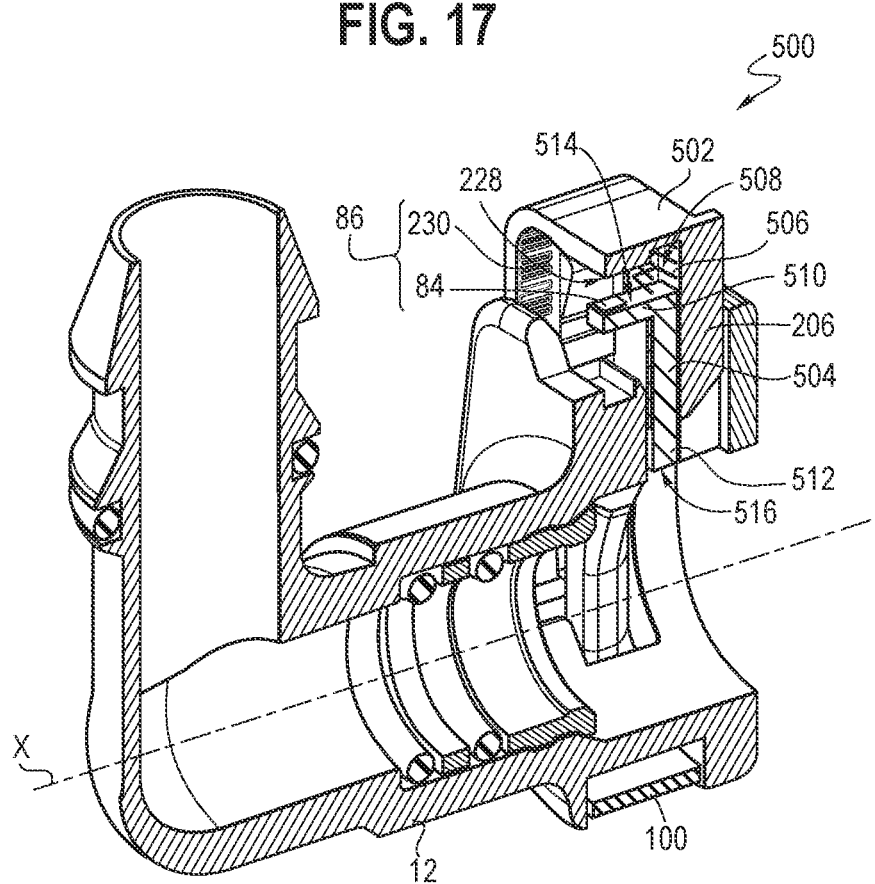
FIG. 17 shows a perspective section-view of the quick connector in accordance with another form of the present disclosure.
Figure 18A:
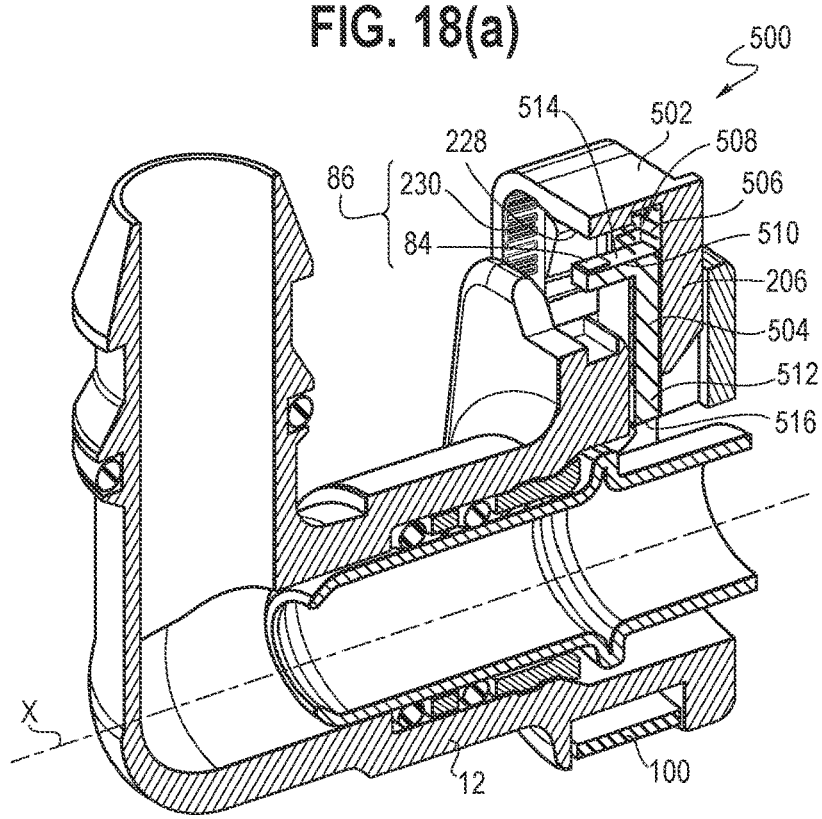
FIG. 18(a) shows a perspective section-end view of the quick connector coupling in an unlatched position of a verifier of FIG. 17
Figure 18B:
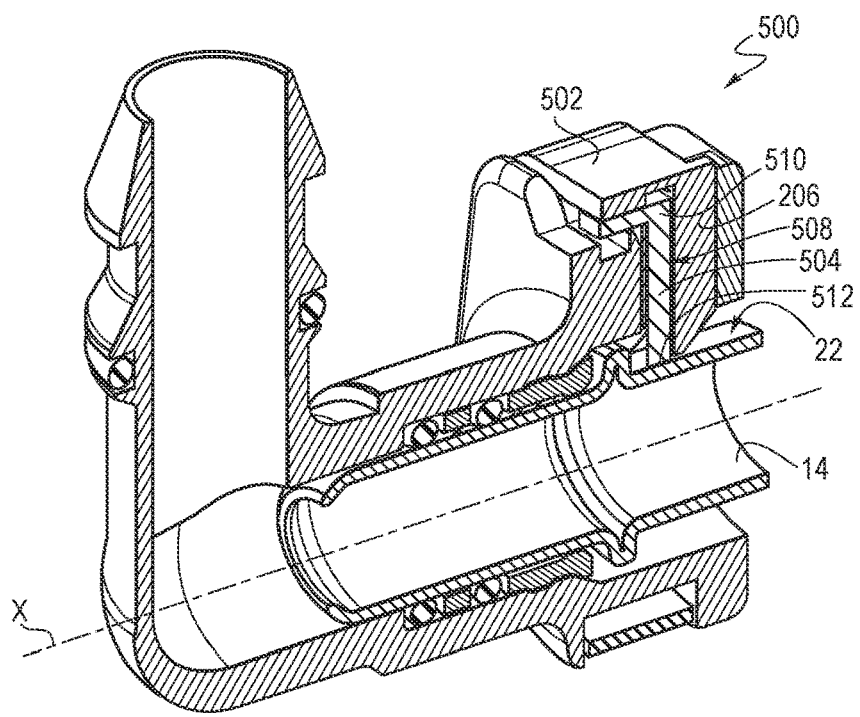
FIG. 18(b) shows a perspective section-end view of the quick connector coupling in a latched position of the verifier of FIG. 17.

A fourth embodiment of a quick connector coupling 500 in accordance with another form of the present disclosure is illustrated in FIGS. 17, 18(*a*), and 18(*b*). The quick connector coupling 500 of the fourth embodiment is essentially the same as the quick connector coupling 10 described above with exception of the arrangement of the chip 84 in the RFID tag 86. As shown in FIG. 17, the chip 84 is also arranged in the verifier 502. The verifier 502 further includes a column member 504 with a resilient device 506 such as a spring. The retainer beam 206 of the verifier 502 has a channel 508 along the length of the retainer beam 206 for placing the column member 504 with the resilient device 506. The column member 504 moves inside the channel 508 of the retainer beam 206 when the verifier 502 is moved to the latched position.

In FIG. 17, the column member 504 includes a first end 510 and a second end 512. The first end 510 is transversely angled and rearwardly extends along the longitudinal axis X. The chip 84 is attached to a top surface 514 of the extended first end 510 and the resilient device 506 is placed and installed between an internal surface inside the channel 508 and the top surface 514 of the first end 510 for returning the column member 504 to the original position of the column member 504 when the verifier 502 is in the unlatched position. The second end 512 of the column member 504 includes a bottom surface 516 curved along the outer surface shape of the male member 14 for abutting on the smooth cylindrical surface 22 when the verifier 200 is moved in the latched position.

FIG. 18(*a*) shows the unlatched position of the verifier 502 and FIG. 18(*b*) shows the latched position of the verifier 502. The antenna 230 is attached along the radially inward facing surface 204 as described above (see FIG. 9). As shown in FIGS. 18(*a*) and 18(*b*), accordingly, the attached chip 84 on the top surface 514 contacts the contact point 228 of the antenna 230 when the verifier 502 is moved in the latched position from the unlatched position. After the inserted male member 14 is locked by the retainer 100, when the verifier 502 is moved in the latched position from the unlatched position, the column member 504 is pushed and moved up due to the smooth cylindrical surface 22 of the male member 14 so that the attached chip 84 on the top surface 514 of the column member 504 abuts (or touches) the contact point 228 of the antenna 230. Due to the contact between the chip 84 and the antenna 230 in the latched position of the verifier 502, the signal from the RFID tag 86 is enabled to read in the server.

Figure 20:
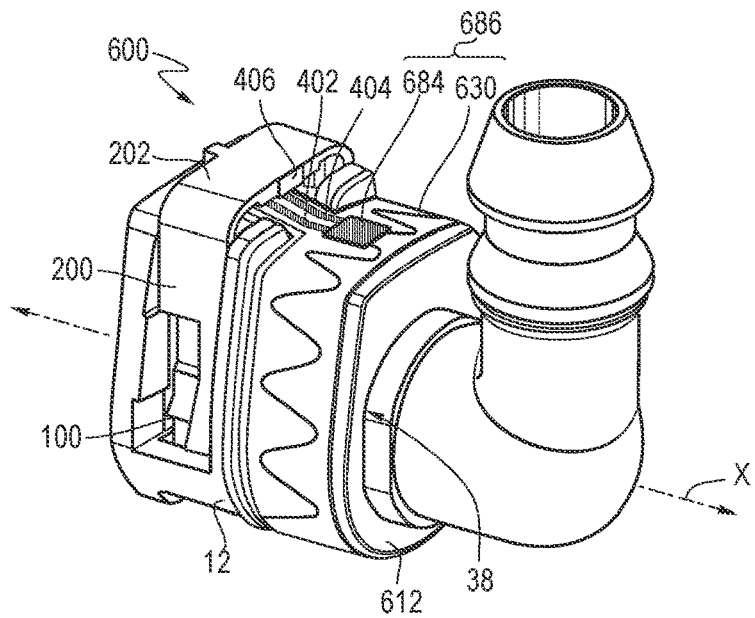
FIG. 20 shows a perspective view of a quick connector in accordance with another form of the present disclosure.

A sixth embodiment of a quick connector coupling 600 in accordance with another form of the present disclosure is illustrated in FIG. 20. The quick connector coupling 600 of the sixth embodiment is essentially the same as the quick connector coupling 400 described above with exception of the arrangement of a RFID tag 686 including a RFID chip 684 and an antenna 630. Particularly, in the quick connector coupling 600 of the present disclosure, the RFID chip 684 of the RFID tag 686 is configured to have a portion of a code altered via a completed circuit. In FIG. 21(*a*), for example, the verification circuit of the RFID chip 684 installed in the quick connector coupling 600 is open in the unlatched (i.e., unverified) position of the verifier 200 as an unverified state which allows the RFID tag 686 to be read with an unverified signal that would translate to "unverified" to the server (or user). Accordingly, the unverified signal is defined as a signal indicating the unverified state of the connector coupling. Further, when the verifier is moved in the latched (i.e., verified) position, as shown in FIG. 21(*b*), the verification circuit of the RFID chip 684 is closed as a verified state which allows the RFID tag 686 to be read with a verified signal that would translate to "verified" to the server (or user). Accordingly, the verified signal is defined as a signal indicating the verified state of the connector coupling.

A passive RFID tag 686 receives a radio frequency (RF) radiation from an active reader and uses the RF radiation to power the RFID chip 684 which sends out the signal (e.g., unverified signal or verified signal) programmed into the RFID chip 684 through the antenna 630. Unlike an active RFID tag having its own power, the passive RFID tag 686 can only broadcast with a reader present. Referring to FIGS. 21(*a*) and 21(*b*), the RFID tag 686 of the present disclosure includes the RFID chip 684 and the antenna 630 electrically connected to the RFID chip 684, and the RFID tag 686 is formed with two separate circuits such as a first circuit 683 and a second circuit 685. In the first circuit 683 of the RFID tag 686, the RFID chip 684 and the antenna 630 are always electrically connected to each other, and in the second circuit 685 of the RFID tag 686, the RFID chip 684 is electrically connected to each of a first wire 402 and a second wire 404. As shown in FIG. 21(*a*), however, the first and second wires 402 and 404 in the second circuit 685 are not electrically connected such that the second circuit 685 of the RFID tag 686 is open. Accordingly, the passive RFID tag 686 can be read with an unverified signal in the reader (or server). Further, when the verifier is moved in the verified position from the unverified position, as shown in FIG. 21(*b*), the second circuit 685 of the RFID tag 686 is closed by a switch such that the first and second wires 402 and 404 are electrically connected to each other. Accordingly, the passive RFID tag 686 can be read with a verified signal in the reader (or server). For example, in FIG. 20, the conductor 406 (i.e., switch) attached to the verifier 200 contacts the first and second wires 402 and 404 when the verifier 200 is moved to the latched position such that the first and second wires 402 and 404 are electrically connected to each other with the contact of the conductor 406.

Referring back to FIG. 20, the quick connector coupling 600 further includes a collar 612 arranged over the seal chamber section 38 of the connector body 12. The collar 612 is configured to keep the antenna 630 separated from the connector body 12 with conductive plastic material and also aid in the assembly of the RFID tag 686 onto the connector body 12. In the quick connector coupling 600 of FIG. 20, the RFID chip 684 and the antenna 630 are attached to the outer surface of the collar 612. The antenna 630 is arranged around the outer surface of the collar 612, and the RFID chip 684 is disposed on the top surface of the collar 612. As shown in FIG. 20, the antenna 630 is formed with a zig-zag or serpentine shape to promote sending the signal from the RFID chip 684 widely in all directions. In another approach, however, the antenna 630 can be formed with different shapes such as a helical shape.

In addition, the RFID tag 686 includes the first wire 402 and the second wire 404 (as a verification strip) connected to the RFID chip 684. The first and second wires 402 and 404 are also attached to the collar 612 and each electrically connected to the RFID chip 684 such that, in the unlatched position of the verifier 200, the RFID chip 684 can send the unverified signal to the server (or user) through the antenna 630. So the unverified signal of the RFID tag 686 conveys the unverified state to the server (or user) that the verifier 200 is still in the unlatched position. Also, as described above, the signal of the RFID tag 686 also includes general information of the quick connector coupling 600 such as a part serial number, location of installation, etc. Accordingly, regardless of the unlatched portion or the latched position of the verifier 200, the server (or user) can receive the general information of the quick connector coupling 600.

Further, as shown in FIG. 20, the conductor 406 is generally attached to the verifier 200 and also formed as a conductive material such as a copper strip for closing the second circuit 685 of the RFID tag 686 in the quick connector coupling 600. The conductor 406 is attached to the connecting member 202 of the verifier 200. When the verifier 200 is moved in the latched position after the male member 14 is inserted into the connector body 12 and securely locked by the retainer 100, the conductor 406 of the verifier 200 contacts the first and second wires 402 and 404 such that the second circuit 685 of the RFID tag 686 is closed. Accordingly, in the latched position of the verifier 200, the unverified signal of the RFID chip 684 is changed to the verified signal such that the server (or user) receives the verified signal having the verified state of the quick connector coupling 600.

In another approach of FIG. 20, the RFID tag 686 could be arranged without the collar 612, which is similar to the exemplary embodiment of FIG. 15. Accordingly, the RFID chip 684 and the antenna 630 are directly attached to the connector body 12, and the function of the RFID tag 686 is generally same as in the exemplary embodiment of FIG. 20 such that in the unlatched position of the verifier 200, the RFID chip 684 sends the unverified signal through the antenna 630 and when the verifier 200 is moved in the latched position, the open circuit of the RFID chip 684 is closed and the RFID chip 684 sends the verified signal to the server (or the user) through the antenna 6309.

A seventh embodiment of a quick connector coupling 700 in accordance with another form of the present disclosure is illustrated in FIGS. 22, 22(*a*), 22(*b*), 23(*a*), and 23(*b*). The quick connector coupling 700 of the seventh embodiment is essentially the same as the quick connector coupling 500 (see FIGS. 17, 18(*a*), and 18(*b*)) described above with exception of the arrangement of a RFID tag 786 including a RFID chip 784 and the antenna 730. Particularly, in the quick connector coupling 700 of the present disclosure, the RFID chip 784 has the same function as the RFID chip 684 arranged in the quick connector coupling 600 as shown in FIG. 20 such that, in the unverified position of the verifier 502, the RFID chip 784 sends an unverified signal to the server (or user), and when the verifier 200 is moved in the verified position, the RFID chip is configured to change the unverified signal to the verified signal that would translate to "verified" to the server (or user).

Further, as shown in FIGS. 22(*a*) and 22(*b*), the verifier 502 includes a column member 504 with a resilient device 506 such as a spring. A retainer beam 206 of the verifier 502 includes a channel 506 sized to receive the column member 504 with the resilient device 506 such that the column member 504 resiliently moves inside the channel 508 when the verifier 502 is moved to the latched position from the unlatched position (see also FIGS. 23(*a*) and 23(*b*)). In FIGS. 22(*a*) and 22(*b*), the column member 504 includes a first end 510 and a second end 512. The antenna 730 is attached along the radially inward facing surface 204 of the verifier 502 and a RFID 786 electrically connected to the antenna 730 is also attached to the radially inward facing surface 204 in a middle area of the connecting member 202 of the verifier 502. Further, the RFID tag 786 includes a first wire 402 and a second wire 404, each electrically connected to the RFID chip 784 and also attached to the inward facing surface 204 adjacent to the RFID chip 784. As shown in FIG. 22(*b*), the verifier 502 has a conductor 406 formed as the conductive material and attached to a top surface 514 of the first end 510 of the column member 504.

Figure 23A:
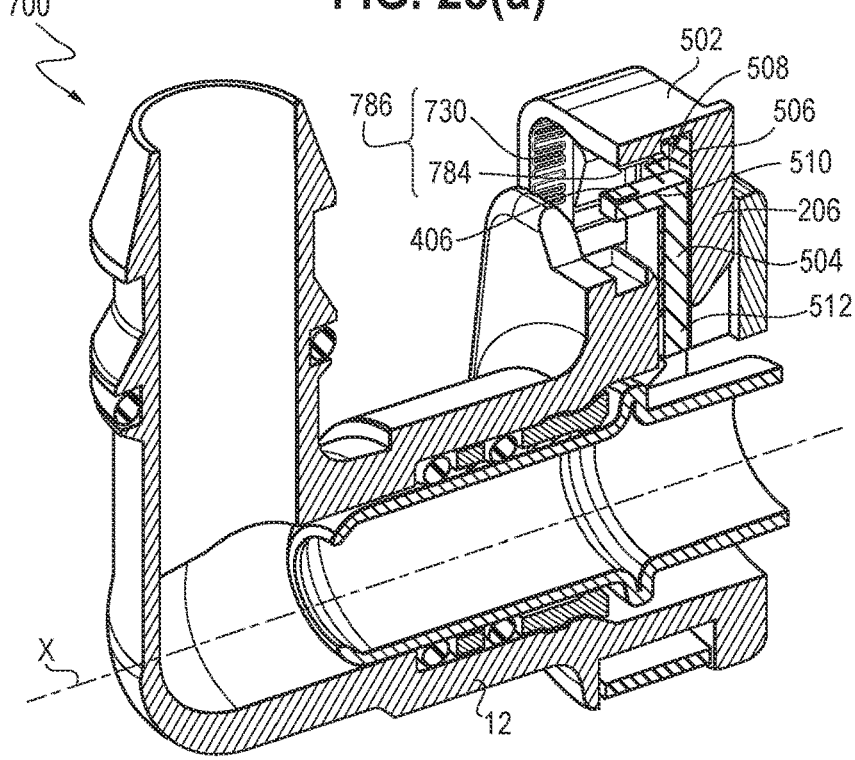
FIG. 23(a) shows a perspective section-end view of the quick connector coupling in an unlatched position of the verifier of FIG. 22.
Figure 23B:
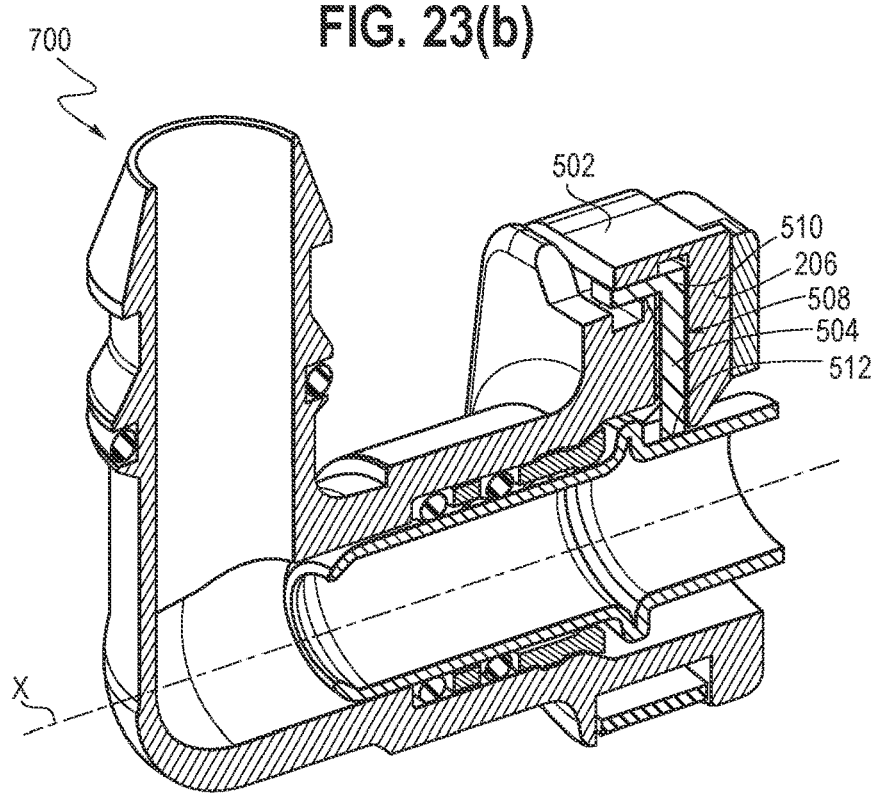
FIG. 23(b) shows a perspective section-end view of the quick connector coupling in a latched position of the verifier of FIG. 22.

FIG. 23(*a*) shows the unlatched position of the verifier 502 and FIG. 23(*b*) shows the latched position of the verifier 502. In the unlatched position of the verifier 502, the RFID chip 784 sends the unverified signal to the server (or the user) through the antenna 730. When the verifier 502 is moved to the latched position, the column member 504 is pushed and moved up by the surface of the male member 12 such that the conductor 406 attached to the column member 504 abuts (or contacts) the first and second wires 402 and 404 attached to the inward facing surface 204 of the verifier 502. Accordingly, when the second circuit 685 of the RFID tag 786 is closed by the contact of the conductor 406 with the first and second wires 402 and 404, the RFID chip 784 changes the signal with the verified state of the quick connector coupling 700 and sends the verified signal to the server (or user) through the antenna 730.

Figure 24:
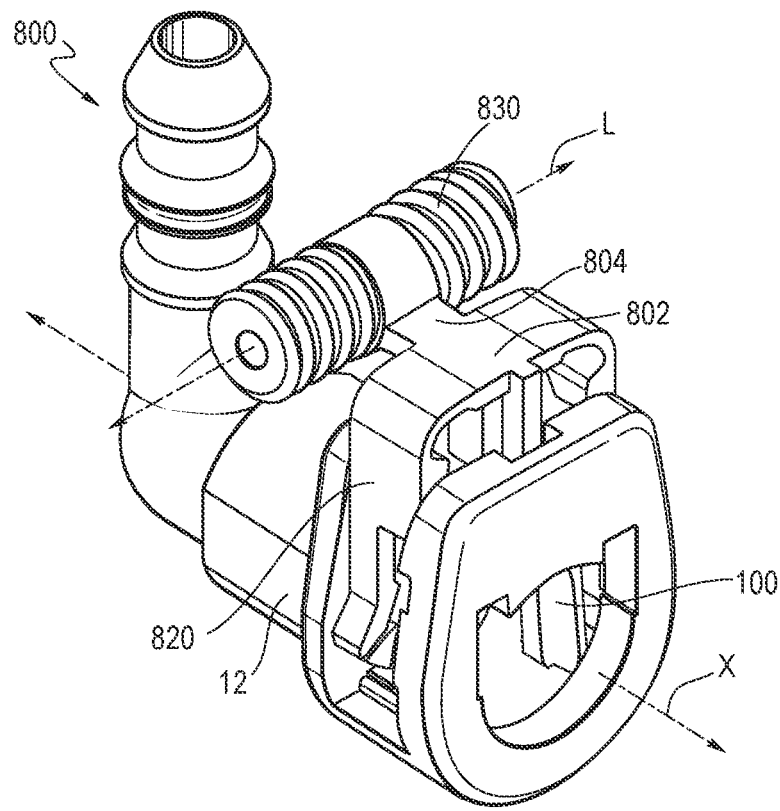
FIG. 24 shows a perspective view of the quick connector in accordance with another form of the present disclosure.

An eighth embodiment of a quick connector coupling 800 in accordance with another form of the present disclosure is illustrated in FIG. 24. This quick connector coupling 800 of the eighth embodiment is generally the same function as the quick connector coupling 600 described above with exception of the verification arrangement of a RFID tag 886 including a RFID chip 884 and an antenna 830. In the quick connector coupling 800 of the present disclosure, the RFID chip 884 is configured to have a portion of a code altered via a completed circuit, which is the same function of the RFID chip 684 arranged in the quick connector coupling 600. In FIG. 24, the quick connector coupling 800 includes a verifier 820 having the antenna 830 and the RFID chip 884 electrically connected to the antenna 830. As shown in FIGS. 24 and 24(*a*), for example, the antenna 830 is formed with a generally helical shape attached to an extension member 804 rearward extending from a connecting member 802 of the verifier 820. The helical or coil antenna may be directly connected to the verifier 820. In FIG. 24, a longitudinal direction L of the helical antenna 830 is arranged transversely from the longitudinal axis X of the connector body 12. In another approach, the antenna 830 can be formed with different coil shapes and sizes (e.g., a strip-based antenna), and also arranged in different directions (e.g. arranged longitudinally or the axis of the coil may be bent or curved rather than straight).

Figure 21A:
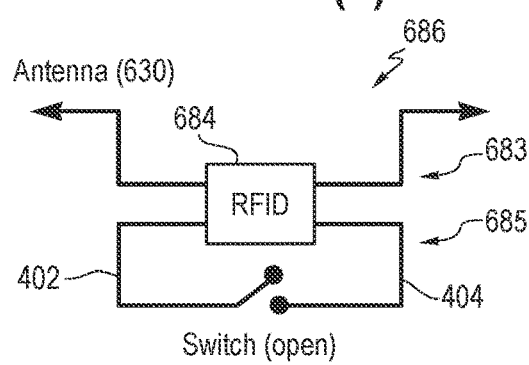
FIG. 21(a) shows a schematic diagram of a closed first circuit and an open second circuit of a RFID tag of FIG. 20.
Figure 21B:
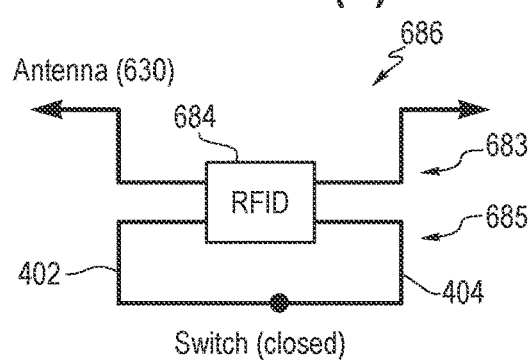
FIG. 21(b) shows a schematic diagram of the closed first and second circuits of the RFID tag of FIG. 20.
Figure 24A:
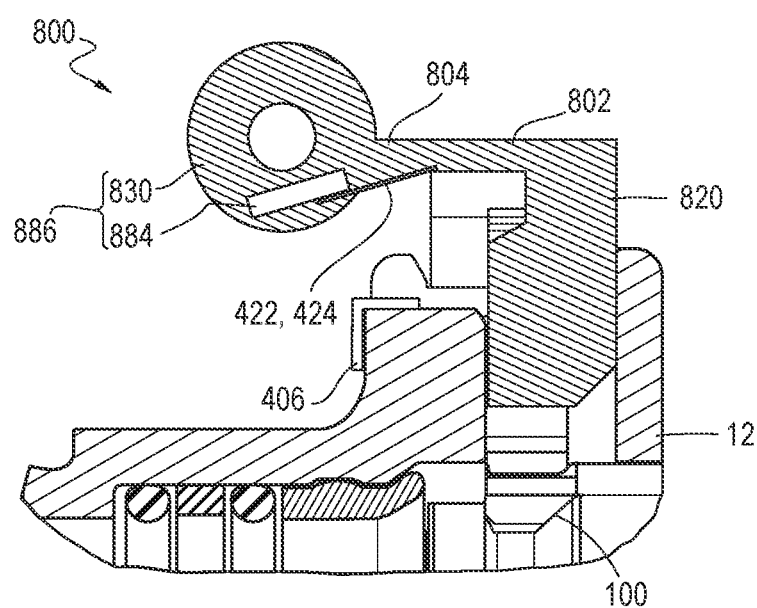
FIG. 24(a) shows a detailed cross-sectional view of the quick connector of FIG. 24.
Figure 25:
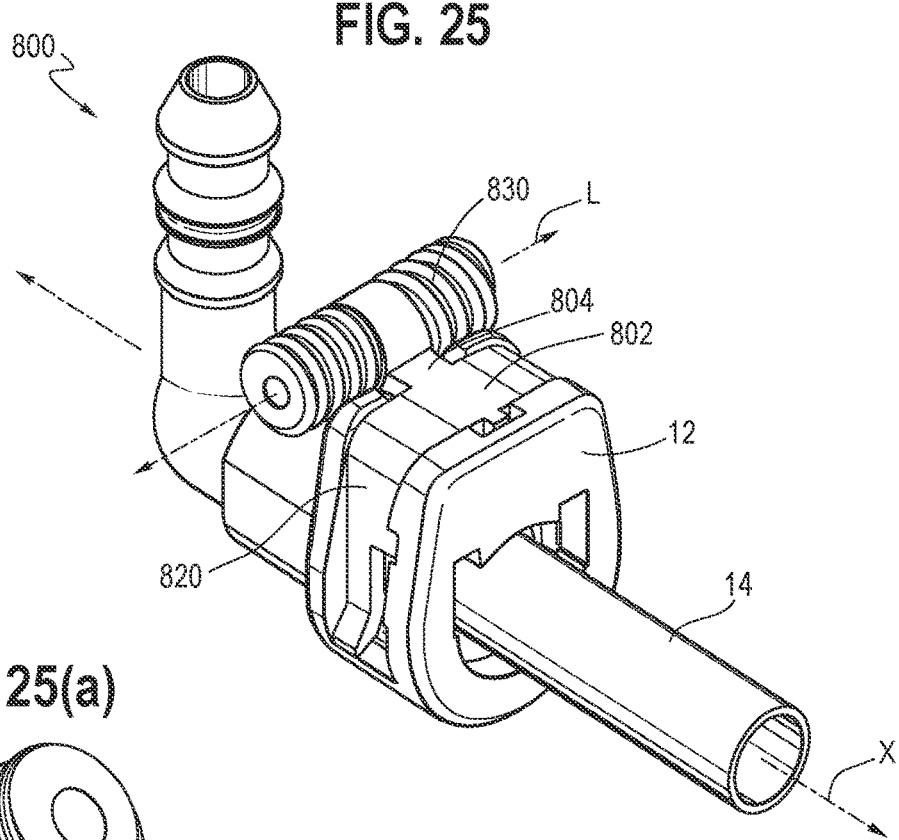
FIG. 25 shows a perspective view of a quick connector coupling of FIG. 24.
Figure 25A:
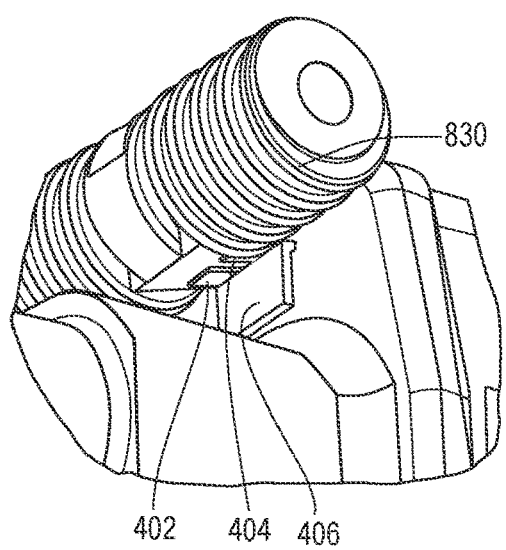
FIG. 25(a) shows a detailed perspective view of the quick connector coupling having a RFID tag.
Figure 25B:
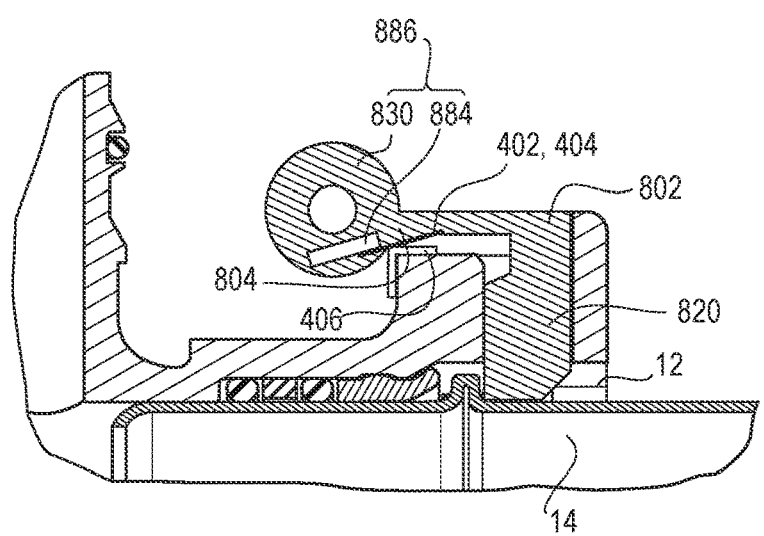
FIG. 25(b) shows a detailed cross-sectional view of the quick connector coupling of FIG. 25.

In FIG. 24(a), the RFID chip 884 is arranged adjacent to the extension member 804 and attached to the verifier 820. The RFID tag 886 further includes a first wire 402 and a second wire 404 extending over the extension member 804 and each wire 402 and 404 being electrically connected to the RFID chip 884. Further, as shown in FIGS. 25, 25(a), and 25(b), a conductor 406 is attached to a recess 60 of the connector body 12 such that, when the verifier 820 is moved to the latched position, both the first and second wires 402 and 404 contact the conductor 406 (which collectively form a switch as shown in FIGS. 21(a) and 21(b)) attached to the recess 60 of the connector body 12. The conductor 406 is formed with an L-shape to facilitate the contact with the first and second wires 402 and 404. In another approach, the conductor 406 can be formed with other shapes such as a flat shape to contact the first and second wires 402 and 404.

Referring back to FIG. 24, in the unverified position of the verifier 820, the RFID chip 884 sends the unverified signal to the server (or user) through the antenna 830. Further, in FIG. 25, when the verifier 820 is moved to the verified position after the male member 14 is fully inserted into the connector body 12 and securely locked by the retainer 100, the first and second wires 402 and 404 contact the conductor 406 such that the second circuit of the RFID tag 886 is closed as shown in FIGS. 21(a) and 21(b). Accordingly, in the latched position of the verifier 820, the unverified signal of the RFID chip 884 is changed to the verified signal such that the server (or user) receives the verified signal having the verified state of the quick connector coupling 800 (i.e., the verifier 820 is in the latched position).

Figure 26A:
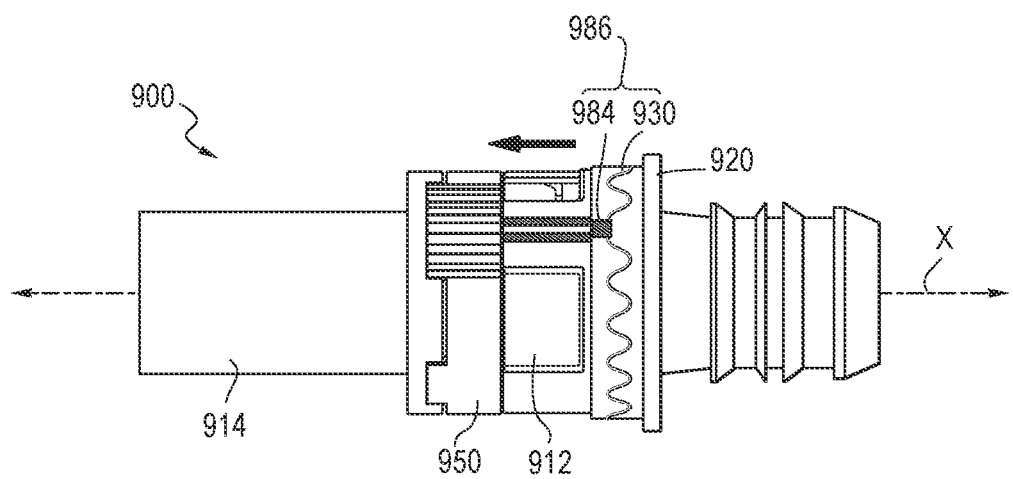
FIG. 26(a) shows a perspective view of a quick connector coupling with an unlatched position of a verifier in accordance with another form of the present disclosure.
Figure 26B:
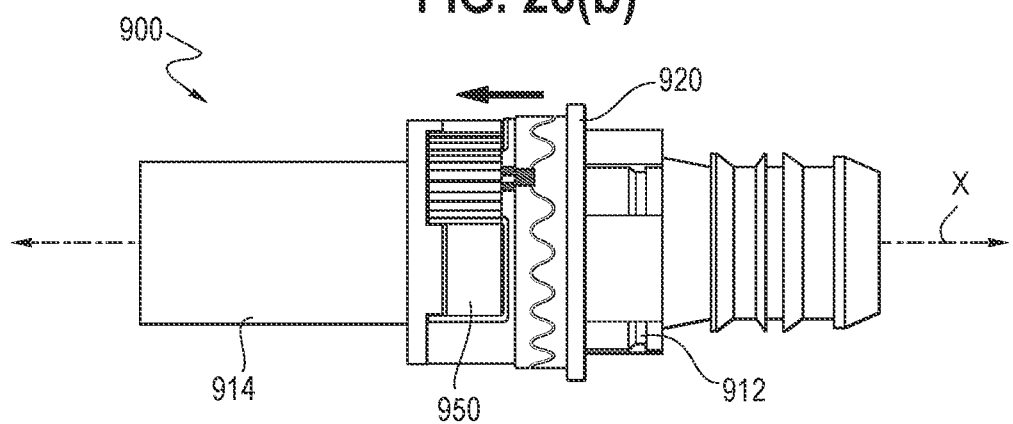
FIG. 26(b) shows a perspective view of the quick connector coupling with a latched position of the verifier of FIG. 26(a)

FIGS. 26(a) and 26(b) are perspective views of a quick connector coupling 900 in accordance with another form of the present disclosure. The quick connector coupling 900 is generally the same function as the quick connector couplings described above with exception of the verification system and arrangement. As shown in FIGS. 26(a) and 26(b), the RFID chip 984 has the same function as the RFID chip 684 described above (see FIGS. 21(a) and 21(b)) such that in the unlatched position (i.e., unverified position) of the verifier 920 (see FIG. 26(a)), the RFID chip 984 sends an unverified signal to the server (or user), and when the verifier 920 is slidably moved in the latched position (i.e., verified position) (see FIG. 26(b)), the RFID chip 984 is configured to change the unverified signal to the verified signal that would translate to "verified" to the server (or user).

Figure 6:
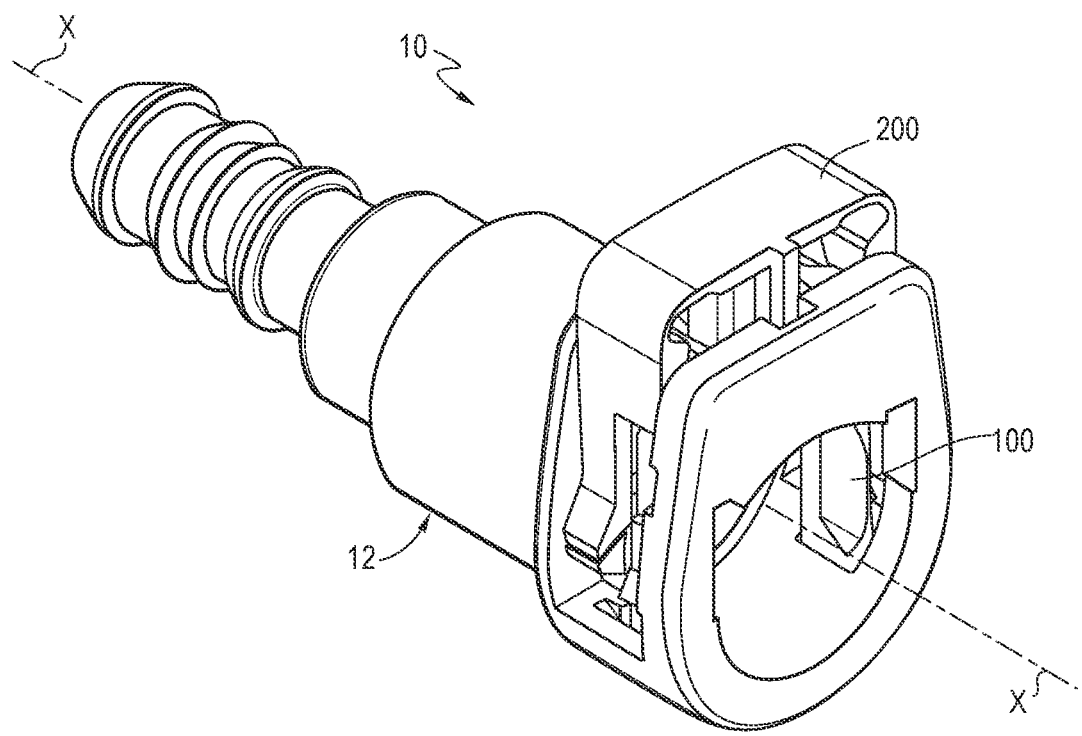
FIG. 6 shows a perspective view of a quick connector in accordance with another exemplary form of the present disclosure.

In FIG. 26(a), the connector body 912 is formed with a straight shape along the longitudinal axis X, which is similar to the exemplary embodiment of FIG. 6 described above. The quick connector coupling 900 includes a retainer 950 having a ring shape extending circumferentially around the connector body 912 and a verifier 920 having an annular body also extending circumferentially around the connector body 912 such that the verifier 920 slidably moves around the connector body 912 along the longitudinal axis X when the male member 914 fully inserted into the connector body 912 and securely engaged with the retainer 950 inside the connector body 912. As shown in FIG. 26(a), in the unlatched position of the verifier 920, the retainer 950 blocks the slidable movement (see arrow) of the verifier 920, and in FIG. 26(b), when the male member 914 is fully inserted, the retainer 950 allows the verifier 920 to slidably move in the latched position.

Figure 27A:
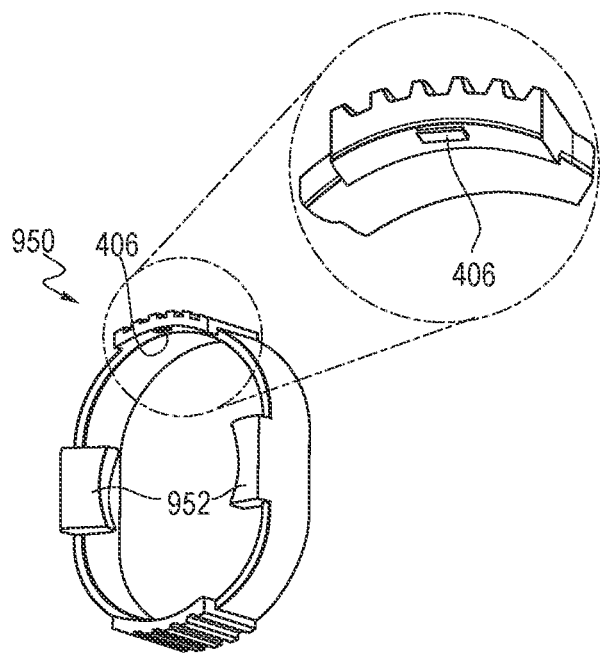
FIG. 27(a) shows a perspective view of a retainer in the quick connector coupling of FIG. 26(a)
Figure 27B:
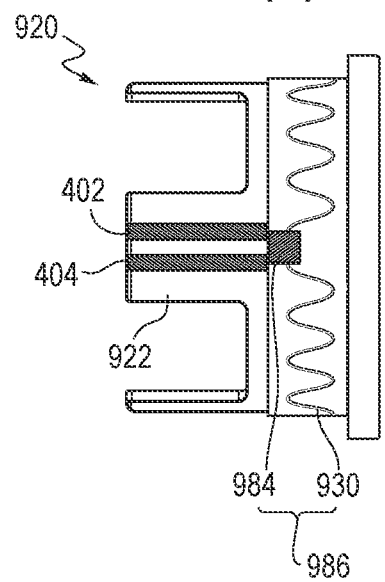
FIG. 27(b) shows a top view of the verifier in the quick connector coupling of FIG. 26(a)
Figure 27C:
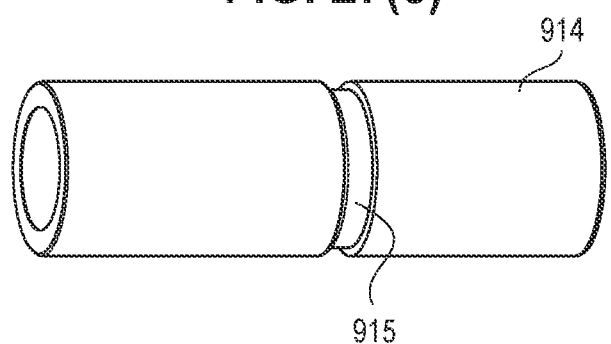
FIG. 27(c) shows a perspective view of a male member in the quick connector coupling of FIG. 26(a).

FIG. 27(a) shows the retainer 950 having a pair of latches 952 to engage a circumferential groove 915 formed in the male member 914 (see FIG. 27(c)) when the male member 914 is inserted into the connector body 912. Further, the retainer 950 has a conductor 406 formed as a conductive material and is attached to an inner surface of the ring. In particular, the conductor 406 is attached to the inner surface of the top portion of the retainer 950. FIG. 27(b) shows the verifier 920 having at least one finger 922 forward extending from the annular body along the longitudinal axis X. For example, in FIG. 27(b), the verifier 920 has four (4) fingers arranged in a top, a bottom, and both sides of the annular body, which are operatively coupled to the connector body 912. As shown in FIG. 27(b), the verifier 920 has the antenna 930 and the RFID chip 984 electrically connected to the antenna 930. The antenna 930 is attached around the annular body and the RFID chip 984 is attached to top portion of the annular body. Further, the RFID tag 986 includes a first wire 402 and a second wire 404 extending over one finger 922 positioned in the top portion of the annular body. Further, each of the first and second wires 402 and 404 is electrically connected to the RFID chip 984.

Referring back to FIGS. 26(a) and 26(b), in the unverified position of the verifier 920, the RFID chip 984 sends the unverified signal to the server (or user) through the antenna 930. When the male member 914 is fully inserted into the connector body 912 and the retainer 950 is securely engaged with the male member 914, the retainer 950 allows the verifier 920 to slidably move in the verified position along the longitudinal axis X. In particular, the finger 922 having the first and second wires 402 and 404 slidably moves inside the retainer ring 950 such that the first and second wires 402 and 404 contact the conductor 406 attached to the top portion of the inner surface of the retainer ring 950. When the verifier 920 is moved in the latched position, the first and second wires 402 and 404 of the verifier 920 contact the conductor 406 of the retainer ring 950 and the second circuit of the RFID tag 986 is closed such that in the latched position of the verifier 920, the unverified signal of the RFID chip 984 is changed to the verified signal. Accordingly, the server (or user) can receive the verified signal having the verified state of the quick connector coupling 800 (i.e., the verifier 920 is in the latched position).

As described above, the RFID tag systems 86 and 686 including the RFID chip 84 and 684, and the antenna 230 and 630 for wirelessly communicating a verification signal is applied to any kinds of the connector coupling systems such as Easy Loc connector having combined retainer and verifier as one element. For example, the RFID chip 84 and the antenna 230 are attached to parts of the connector coupling systems and the RFID tag 86 system sends a verification signal from the RFID chip 84 to the server through the antenna 230 when the coupling of the connector body and the tube is secured and verified. In another approach, another RFID chip 684 is configured to change the mode of the verification state between the latched position (verified position) of the verifier 200 allowing the RFID tag 686 to be read with the verified signal and the unlatched position (unverified position) of the verifier 200 allowing the RFID tag 686 to be read with the unverified signal (see FIGS. 21(a) and 21(b)). In the present disclosure, the "latched" and "unlatched" positions of the verifier do not require that the verifier locks the inserted male member, but it may also provide that function.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A quick connector coupling for making a severable connection with a male member and a female tube in a fluid line, the quick connector coupling comprising:
    a connector body having a through bore for receiving the male member having a tubular shape sized to extend into the through bore of the connector body and having an upset, the connector body including a radio frequency identification (RFID) chip and an antenna attached to an exterior of the connector body and electrically connected to the RFID chip to form a first circuit;
    a retainer releasably securing the male member within the connector body; and
    a verifier including a conductor, the verifier coupled to the connector body and moving between a verified position and an unverified position inside the connector body,
    wherein, in the unverified position of the verifier, the RFID chip sends an unverified signal through the antenna, and when the verifier is moved in the verified position such that the conductor is electrically connected to the RFID chip to form a second circuit, the RFID chip sends a verified signal through the antenna.

2. The quick connector coupling of claim 1, wherein a RFID tag includes a first wire and a second wire attached to the connector body and each wire electrically connected to the RFID chip in the unverified position of the verifier defined as an unverified state such that the unverified state allows the RFID tag having the RFID chip and the antenna to be read with the unverified signal.

3. The quick connector coupling of claim 2, wherein the RFID chip is configured to change the unverified signal to the verified signal when the conductor of the verifier contacts the first and second wires in the verified position of the verifier defined as a verified state such that the verified state allows the RFID tag to be read with the verified signal.

4. The quick connector coupling of claim 1, wherein the connector body further includes a collar arranged over a seal chamber section of the connector body such that the collar is positioned rearward from a housing section.

5. The quick connector coupling of claim 4, wherein the antenna is attached around an outer surface of the collar and the RFID chip electrically connected to the antenna is attached to an upper surface of the collar.

6. A quick connector coupling for making a severable connection with a male member and a female tube in a fluid line, the quick connector coupling comprising:
    a connector body having a through bore for receiving the male member having a tubular shape sized to extend into the through bore of the connector body and having an upset;
    a retainer releasably securing the male member within the connector body; and
    a verifier including a retainer beam having a channel and a column member moving inside the channel, the verifier carrying a conductor, an antenna, and a radio frequency identification (RFID) chip electrically connected to the antenna,
    wherein the verifier is coupled to the connector body and moved between a verified position and an unverified position by an up and down linear movement of the column member along a longitudinal direction of the channel,
    wherein, in the unverified position of the verifier, the RFID chip sends an unverified signal through the antenna, and when the verifier is moved in the verified position such that the conductor is electrically connected to the RFID chip, the RFID chip sends a verified signal through the antenna.

7. The quick connector coupling of claim 6, wherein a first end of the column member contacts a portion of an inwardly facing surface of the verifier when the verifier is moved to the verified position from the unverified position.

8. The quick connector coupling of claim 7, wherein the antenna is attached around the radially inward facing surface of the verifier and the RFID chip is attached adjacent to the portion of the inwardly facing surface of the verifier such that the RFID chip electrically connected to the antenna forms a first circuit, and the conductor is attached to a top surface of the first end of the column member resiliently moved inside the channel of the verifier.

9. The quick connector coupling of claim 8, wherein a RFID tag includes a first wire and a second wire attached to the inwardly facing surface of the verifier and each wire electrically connected to the RFID chip to form a second circuit in the unverified position of the verifier defined as an unverified state such that the unverified state allows the RFID tag having the RFID chip and the antenna to be read with the unverified signal.

10. The quick connector coupling of claim 9, wherein, in the unverified state, the first circuit of the RFID tag is always closed but the second circuit of the RFID tag is open, and wherein the RFID chip is configured to change the unverified signal to the verified signal when the conductor electrically connects the first and second wires in the verified position of the verifier defined as a verified state such that, in the verified state, the second circuit of the RFID tag is closed and the verified state allows the RFID tag to be read with the verified signal.

11. A quick connector coupling for making a severable connection with a male member and a female tube in a fluid line, the quick connector coupling comprising:
    a connector body having a through bore for receiving the male member having a tubular shape sized to extend into the through bore of the connector body and having an upset;
    a retainer releasably securing the male member within the connector body;
    a conductor fixedly attached to the connector body; and
    a verifier including an antenna and a radio frequency identification (RFID) chip electrically connected to the antenna to form a first circuit, the verifier coupled to the connector body and moving between a verified position and an unverified position inside the connector body, wherein the antenna and the RFID chip are arranged in the verifier, and wherein, in the unverified position of the verifier, the RFID chip sends an unverified signal through the antenna, and when the verifier is moved in the verified position such that the conductor is electrically connected to the RFID chip to form a second circuit, the RFID chip sends a verified signal through the antenna.

12. The quick connector coupling of claim 11, wherein a RFID tag includes a first wire and a second wire attached to the verifier and each electrically connected to the RFID chip in the unverified position of the verifier defined as an unverified state such that the unverified state allows a RFID tag having the RFID chip and the antenna to be read with the unverified signal.

13. The quick connector coupling of claim 12, wherein the RFID chip is configured to change the unverified signal to the verified signal when the conductor of the connector body contacts the first and second wires in the verified position of the verifier defined as a verified state such that the verified state allows the RFID tag to be read with the verified signal.

14. The quick connector coupling of claim 13, wherein the conductor is attached to a recess formed in the connector body such that the first and second wires attached to the verifier contact the conductor when the verifier is moved in the verified position form the unverified position.

15. The quick connector coupling of claim 11, wherein the antenna is formed with a generally helical shape attached to an extension member extending rearward from a connecting member of the verifier and the RFID chip is attached to the extension member adjacent to the antenna.

16. A quick connector coupling for making a severable connection with a male member and a female tube in a fluid line, the quick connector coupling comprising:
  a connector body having a through bore for receiving the male member having a tubular shape sized to extend into the through bore of the connector body;
  a retainer releasably securing the male member within the connector body, the retainer comprising a ring extending circumferentially around the connector body and including a conductor attached to an inner surface of the retainer; and
  a verifier comprising an annular body extending circumferentially around the connector body, the verifier including an antenna and a radio frequency identification (RFID) chip electrically connected to the antenna to form a first circuit and moving between a verified position and an unverified position,
  wherein, in the unverified position of the verifier, the RFID chip sends an unverified signal through the antenna, and when the verifier is moved in the verified position such that the conductor is electrically connected to the RFID chip to form a second circuit, the RFID chip sends a verified signal through the antenna.

17. The quick connector coupling of claim 16, wherein the antenna is attached around an outer surface of the annular body of the verifier, the RFID chip is attached to a top surface of the verifier.

18. The quick connector coupling of claim 17, wherein the retainer having the conductor allows the verifier to slidably move around the connector body along a longitudinal axis of the connector body when the male member is securely inserted into the connector body.

19. The quick connector coupling of claim 18, wherein the verifier further includes at least one finger extending forward from the annular body along the longitudinal axis and the antenna includes a first wire and a second wire extending over the at least one finger of the verifier and each being electrically connected to the RFID chip.

20. The quick connector coupling of claim 19, wherein the finger of the verifier having the first and second wires slidably moves inside the retainer ring when the verifier is moved to the verified position from the unverified position along the longitudinal axis such that the first and second wires of the antenna contact the conductor attached to the portion of the inner surface of the retainer and the RFID chip is operable to change the unverified signal to the verified signal.

* * * * *